United States Patent
Huang et al.

(10) Patent No.: US 11,629,230 B1
(45) Date of Patent: Apr. 18, 2023

(54) TERNARY ORTHOGONAL PHOTOPOLYMERS

(71) Applicant: META PLATFORMS TECHNOLOGIES, LLC, Menlo Park, CA (US)

(72) Inventors: Sijia Huang, Boulder, CO (US); Thomas John Farrell Wallin, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 257 days.

(21) Appl. No.: 17/062,355

(22) Filed: Oct. 2, 2020

Related U.S. Application Data

(60) Provisional application No. 62/909,671, filed on Oct. 2, 2019.

(51) Int. Cl.
*C08F 2/46* (2006.01)
*C08F 2/50* (2006.01)
*C08G 61/04* (2006.01)
*C08G 75/12* (2016.01)
*B33Y 70/00* (2020.01)
*B29K 81/00* (2006.01)
*B29C 64/124* (2017.01)
*B33Y 10/00* (2015.01)

(52) U.S. Cl.
CPC .............. *C08G 75/12* (2013.01); *B33Y 70/00* (2014.12); *B29C 64/124* (2017.08); *B29K 2081/00* (2013.01); *B33Y 10/00* (2014.12)

(58) Field of Classification Search
CPC ............... C08F 2/46; C08F 2/50; C08G 61/04
USPC ........... 522/36, 33, 6, 71, 189, 184, 1; 520/1
See application file for complete search history.

(56) References Cited

PUBLICATIONS

Guzman et al, Reparation of click thiol-ene/thiol-epoxy thermosets by controlled photo/thermal dual curing sequence, Nov. 20, 2015, RSC Adv., 5, 101623-101633 (Year: 2015).*

* cited by examiner

*Primary Examiner* — Jessica Whiteley
(74) *Attorney, Agent, or Firm* — Morgan, Lewis & Bockius LLP

(57) ABSTRACT

The disclosure provides methods of generating a modulus gradient in a polymeric material, resin mixtures for such methods, and polymeric materials thereof having at least a modulus gradient.

15 Claims, 13 Drawing Sheets

TERNARY ORTHOGONAL PHOTOPOLYMERS

CROSS-REFERENCE TO RELATED APPLICATION

This application claims the benefit of U.S. Provisional Patent Application No. 62/909,671, filed Oct. 2, 2019, which is incorporated by reference herein in its entirety.

TECHNICAL FIELD

Polymers having a modulus gradient and methods of making thereof are provided, including specific resin mixtures and sequences of applying polymerization and/or crosslinking stimuli.

BACKGROUND

Conventional resin exchange methods or other means that control the deposition of liquid precursor can allow for multi-material fabrication. However, these techniques require multiple resin stocks and cleaning steps, which drastically reduce manufacturing speeds. The art has explored the methodology needed to construct two-stage polymers and their potential application in shape memory materials, holographic materials, impression and imprint materials, microarrays, adhesives, etc. However, typical sequential polymerizations usually utilize either a single photo trigger (at a certain wavelength) or a combined thermal/photo trigger to control the network formation using two crosslinking reactions. Currently, there are a few examples of N=2 photochemistry systems that can coexist within the same material, including light intensity controlled multimaterials and wavelength-selective polymerization processes. However, these examples suffer from many drawbacks, including that the resulting material is not stable under sunlight, and/or that the resulting material has a gradient of 1-4 orders of magnitude difference in modulus. The disclosure provides materials, methods, and processes to overcome these drawbacks.

SUMMARY

The disclosure provides a method of generating a modulus gradient in a polymeric material, the method comprising subjecting an initial precursor resin mixture to a polymerization or crosslinking stimulus, wherein the initial precursor resin mixture comprises one or more monomers, the one or more monomers comprising at least three different polymerizable or crosslinkable moieties. In some embodiments, the method further comprises generating one or more intermediate resin mixtures, wherein the processing further comprises subjecting the one or more intermediate resin mixtures to one or more polymerization and/or crosslinking stimuli. In some embodiments, the one or more intermediate resin mixtures are partially crosslinked or partially polymerized. In some embodiments, the polymerizable or crosslinkable moieties are selected from an alkene group, a thiol group, and an epoxy group. In some embodiments, the one or more intermediate resin mixtures comprise at least one group selected from —S— and —S—CH$_2$—CH(OH)—. In some embodiments, the one or more intermediate resin mixtures comprise at least one group selected from —S—, —S—CH$_2$—CH(OH)—, and —CH$_2$—CH(—)—O—. In some embodiments, the polymeric material comprises at least one group selected from —S—, —S—CH$_2$—CH (OH)—, and —CH$_2$—CH(—)—O—. In some embodiments, the one or more monomers are selected from a monofunctional monomer, a bifunctional monomer, a trifunctional monomer, and a tetrafunctional monomer. In some embodiments, the one or more monomers are selected from BisDE, TATATO, GDMP, and PETMP. In some embodiments, the one or more polymerization and/or crosslinking stimuli are selected from subjecting the initial precursor resin mixture and/or any of the intermediate resin mixtures to a light source and/or a raised temperature. In some embodiments, a polymerization and/or crosslinking stimulus is subjecting the initial precursor resin mixture to a light source. In some embodiments, the polymerization and/or crosslinking stimuli include subjecting any of the intermediate resin mixtures to at least a first raised temperature. In some embodiments, the polymerization and/or crosslinking stimuli include subjecting any of the intermediate resin mixtures to at least a first raised temperature and a second raised temperature. In some embodiments, the polymerization and/or crosslinking stimuli are selected from subjecting any of the intermediate resin mixtures to at least two different raised temperatures. In some embodiments, a first raised temperature is between about 50° C. and about 150° C. In some embodiments, a first raised temperature is between about 50° C. and about 100° C. In some embodiments, a first raised temperature is between about 75° C. and about 85° C. In some embodiments, a first raised temperature is about 80° C. In some embodiments, a first raised temperature is about 80° C., about 100° C., about 120° C., or about 150° C. In some embodiments, a second raised temperature is between about 100° C. and about 150° C. In some embodiments, a second raised temperature is between about 115° C. and about 125° C. In some embodiments, a second raised temperature is about 120° C. In some embodiments, a ramp rate to the first raised temperature or to the second raised temperature is about 0.5° C./min, about 1° C./min, about 2° C./min, about 5° C./min, about 10° C./min, or about 20° C./min. In some embodiments, the initial precursor resin mixture further comprises a photoinitiator. In some embodiments, the modulus is selected from Young's modulus (E), shear modulus or modulus of rigidity (G), and bulk modulus (K). In some embodiments, the modulus is Young's modulus (E). In some embodiments, the modulus is storage modulus and/or loss modulus. In some embodiments, the method is a 3D printing method.

The disclosure also provides a polymeric material having at least one modulus gradient in a spatial direction, the polymeric material made by a method described herein.

The disclosure also provides a polymeric material having a modulus gradient over one spatial direction, wherein modulus is measured in a plurality of voxels. In some embodiments, the modulus is selected from Young's modulus (E), shear modulus or modulus of rigidity (G), and bulk modulus (K). In some embodiments, the modulus is Young's modulus (E). In some embodiments, the modulus is storage modulus and/or loss modulus. In some embodiments, the modulus ranges from about $10^2$ to about $10^{10}$ Pa. In some embodiments, the modulus ranges from about $10^2$ to about $10^6$ Pa. In some embodiments, the modulus ranges from about $10^3$ to about $10^5$ Pa. In some embodiments, the modulus ranges from about $10^5$ to about $10^{10}$ Pa. In some embodiments, the polymeric material comprises at least one group selected from —S—, —S—CH$_2$—CH(OH)—, and —CH$_2$—CH(—)—O—.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIG. 1A illustrates how light dosage can effectively control materials properties. Dosage controlled thiol conversion based on thiol-ene photopolymerization and the residual thiol lead to sequential thiol-epoxy and epoxy homopolymerization; FIG. 1B illustrates the reaction mechanism for photo-controlled step growth polymerization; FIG. 1C illustrates the reaction mechanism for thermally initiated step growth polymerization; FIG. 1D illustrates the reaction mechanism for thermally initiated chain growth polymerization; FIG. 1E illustrates a material selection for some embodiments, including exemplary and non-limiting functionalities, and exemplary and non-limiting ratios; FIG. 1F illustrates a process described herein, including exemplary and non-limiting steps and results of polymerization and/or crosslinking, stimuli, and molar conversions; FIGS. 1G-1H illustrate exemplary and non-limiting processes' steps described herein, including polymerization and/or crosslinking steps.

FIG. 2A: change in modulus for no light exposure; FIG. 2B: change in modulus for exposure to 5 mW/cm² visible light; FIG. 2C: change in modulus for exposure to 14 mW/cm² visible light; FIG. 2D: change in conversion for $H_e$=0 mJ·cm$^{-2}$ and x≈0; FIG. 2E: change in conversion for $H_e$=62.5 mJ·cm$^{-2}$ and x≈0.52; FIG. 2F: change in conversion for $H_e$=175 mJ·cm$^{-2}$ and x≈0.98.

DETAILED DESCRIPTION

Figure 1A:
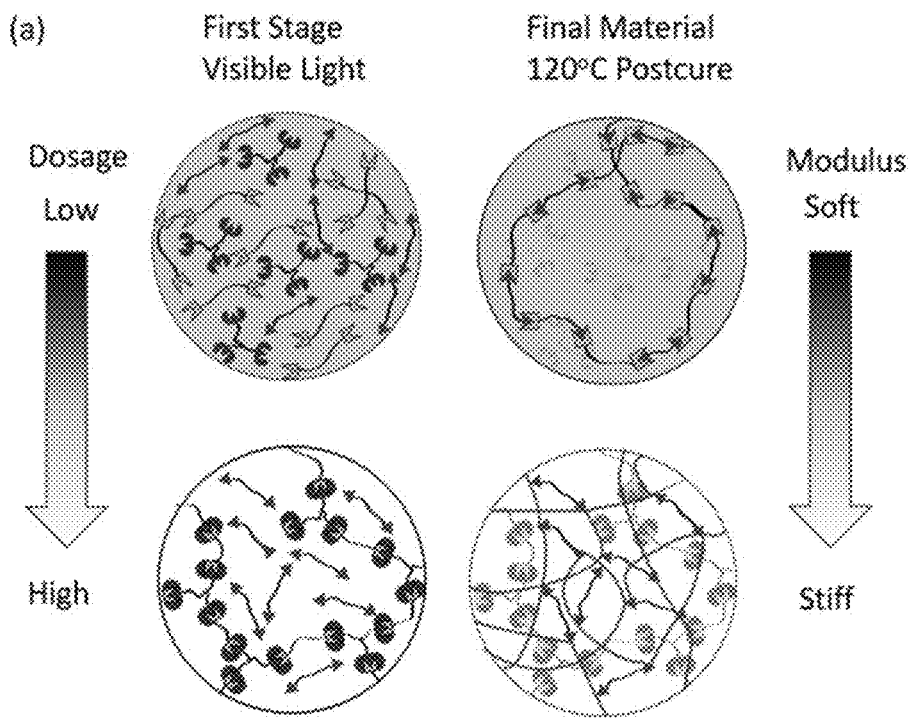
FIGS. 1A-1H illustrate a dosage depended photopolymer resin mixture with tunable properties, and reaction(s) mechanism.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Unless defined otherwise, all technical and scientific terms used herein have the same meaning as is commonly understood by one of skill in the art to which this disclosure belongs. All patents and publications referred to herein are incorporated by reference in their entireties.

When ranges are used herein to describe, for example, physical or chemical properties such as molecular weight or chemical formulae, all combinations and subcombinations of ranges and specific embodiments therein are intended to be included. Use of the term "about" when referring to a number or a numerical range means that the number or numerical range referred to is an approximation within experimental variability (or within statistical experimental error), and thus the number or numerical range may vary. The variation is typically from 0% to 15%, or from 0% to 10%, or from 0% to 5% of the stated number or numerical range. The term "including" (and related terms such as "comprise" or "comprises" or "having" or "including") includes those embodiments such as, for example, an embodiment of any composition of matter, method or process that "consist of" or "consist essentially of" the described features.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

The term "light source" refers to any source of electromagnetic radiation of any wavelength, including without limitation an actinic radiation. In some embodiments, a light source can be a laser of a particular wavelength.

The term "photoinitiating light source" refers to a light source that activates a photoinitiator, a photoactive polymerizable material, or both. Photoiniating light sources include recording light, but are not so limited.

The term "photopolymerization" refers to any polymerization reaction caused by exposure to a photoinitiating light source.

The term "free radical polymerization" refers to any polymerization reaction that is initiated by any molecule comprising a free radical or radicals.

The term "cationic polymerization" refers to any polymerization reaction that is initiated by any molecule comprising a cationic moiety or moieties.

The term "anionic polymerization" refers to any polymerization reaction that is initiated by any molecule comprising an anionic moiety or moieties.

The term "photoinitiator" refers to the conventional meaning of the term photoinitiator and also refers to sensitizers and dyes. In general, a photoinitiator causes the light initiated polymerization of a material, such as a photoactive oligomer or monomer, when the material containing the photoinitiator is exposed to light of a wavelength that activates the photoinitiator, e.g., a photoinitiating light source. The photoinitiator may refer to a combination of components, some of which individually are not light sensitive, yet in combination are capable of curing the photoactive oligomer or monomer, examples of which include a dye/amine, a sensitizer/iodonium salt, a dye/borate salt, etc.

The term "photoinitiator component" refers to a single photoinitiator or a combination of two or more photoinitiators. For example, two or more photoinitiators may be used in the photoinitiator component of the present disclosure to allow recording at two or more different wavelengths of light.

The term "polymerizable component" refers to one or more photoactive polymerizable materials, and possibly one or more additional polymerizable materials, e.g., monomers and/or oligomers, that are capable of forming a polymer.

The term "polymerizable moiety" refers to a chemical group capable of participating in a polymerization reaction, at any level, for example, initiation, propagation, etc. Polymerizable moieties include, but are not limited to, addition polymerizable moieties and condensation polymerizable moieties. Polymerizable moieties include, but are not limited to, double bonds, triple bonds, and the like.

The term "photoactive polymerizable material" refers to a monomer, an oligomer and combinations thereof that polymerize in the presence of a photoinitiator that has been activated by being exposed to a photoinitiating light source, e.g., recording light. In reference to the functional group that undergoes curing, the photoactive polymerizable material comprises at least one such functional group. It is also understood that there exist photoactive polymerizable materials that are also photoinitiators, such as N-methylmaleimide, derivatized acetophenones, etc., and that in such a case, it is understood that the photoactive monomer and/or oligomer of the present disclosure may also be a photoinitiator.

The term "photopolymer" refers to a polymer formed by one or more photoactive polymerizable materials, and possibly one or more additional monomers and/or oligomers.

The term "polymerization retarder" refers to one or more compositions, compounds, molecules, etc., that are capable of slowing, reducing, etc., the rate of polymerization while the photoinitiating light source is off or absent, or inhibiting the polymerization of the polymerizable component when the photoinitiating light source is off or absent. A polymerization retarder is typically slow to react with a radical (compared to an inhibitor), thus while the photoinitiating light source is on, polymerization continues at a reduced rate because some of the radicals are effectively terminated by the retarder. In some embodiments, at high enough concentrations, a polymerization retarder can potentially behave as a polymerization inhibitor. In some embodiments, it is desirable to be within the concentration range that allows for retardation of polymerization to occur, rather than inhibition of polymerization.

The term "polymerization inhibitor" refers to one or more compositions, compounds, molecules, etc., that are capable of inhibiting or substantially inhibiting the polymerization of the polymerizable component when the photoinitiating light source is on or off. Polymerization inhibitors typically react very quickly with radicals and effectively stop a polymerization reaction. Inhibitors cause an inhibition time during which little to no photopolymer forms, e.g., only very small chains. Typically, photopolymerization occurs only after nearly 100% of the inhibitor is reacted.

The term "chain transfer agent" refers to one or more compositions, compounds, molecules, etc. that are capable of interrupting the growth of a polymeric molecular chain by formation of a new radical that may react as a new nucleus for forming a new polymeric molecular chain. Typically, chain transfer agents cause the formation of a higher proportion of shorter polymer chains, relative to polymerization reactions that occur in the absence of chain transfer agents. In some embodiments, certain chain transfer agents can behave as retarders or inhibitors if they do not efficiently reinitiate polymerization.

Unless otherwise stated, the chemical structures depicted herein are intended to include compounds which differ only in the presence of one or more isotopically enriched atoms. For example, compounds where one or more hydrogen atoms is replaced by deuterium or tritium, or where one or more carbon atoms is replaced by $^{13}$C- or $^{14}$C-enriched carbons, are within the scope of this disclosure.

An "alkene" moiety refers to a group consisting of at least two carbon atoms and at least one carbon-carbon double bond, and an "alkyne" moiety refers to a group consisting of at least two carbon atoms and at least one carbon-carbon triple bond. "Alkenyl" refers to a straight or branched hydrocarbon chain radical group consisting solely of carbon and hydrogen atoms, containing at least one double bond, and having from two to ten carbon atoms (e.g., ($C_{2-10}$) alkenyl or $C_{2-10}$ alkenyl). Whenever it appears herein, a numerical range such as "2 to 10" refers to each integer in the given range—e.g., "2 to 10 carbon atoms" means that the alkenyl group may consist of 2 carbon atoms, 3 carbon atoms, etc., up to and including 10 carbon atoms. The alkenyl moiety may be attached to the rest of the molecule by a single bond, such as for example, ethenyl (e.g., vinyl), prop-1-enyl (e.g., allyl), but-1-enyl, pent-1-enyl and penta-1,4-dienyl. Unless stated otherwise specifically in the specification, an alkenyl group is optionally substituted by one or more substituents which are independently alkyl, heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —OR$^a$, —SR$^a$, —OC(O)—R$^a$, —N(R$^a$)$_2$, —C(O)R$^a$, —C(O)OR$^a$, —OC(O)N(R$^a$)$_2$, —C(O)N(R$^a$)$_2$, —N(R$^a$)C(O)OR$^a$, —N(R$^a$)C(O)R$^a$, —N(R$^a$)C(O)N(R$^a$)$_2$, N(R$^a$)C(N-R$^a$)N(R$^a$)$_2$, —N(R$^a$)S(O)$_t$R$^a$ (where t is 1 or 2), —S(O)$_t$R$^a$ (where t is 1 or 2), —S(O)$_t$OR$^a$ (where t is 1 or 2), —S(O)$_t$N(R$^a$)$_2$ (where t is 1 or 2), —S(O)$_t$N(R$^a$)C(O)R$^a$ (where t is 1 or 2), or PO$_3$(R$^a$)$_2$, where each R$^a$ is independently hydrogen, alkyl, fluoroalkyl, carbocyclyl, carbocylylalkyl, aryl, aralkyl, heterocycloalkyl, heterocycloalkylalkyl, heteroaryl or heteroarylalkyl.

"Moiety" refers to a specific segment or functional group of a molecule. Chemical moieties are often recognized chemical entities embedded in or appended to a molecule.

"Substituted" means that the referenced group may have attached one or more additional groups, radicals or moieties individually and independently selected from, for example, acyl, alkyl, alkylaryl, cycloalkyl, aralkyl, aryl, carbohydrate, carbonate, heteroaryl, heterocycloalkyl, hydroxy, alkoxy, aryloxy, mercapto, alkylthio, arylthio, cyano, halo, carbonyl, ester, thiocarbonyl, isocyanato, thiocyanato, isothiocyanato, nitro, oxo, perhaloalkyl, perfluoroalkyl, phosphate, silyl, sulfinyl, sulfonyl, sulfonamidyl, sulfoxyl, sulfonate, urea, and amino, including mono- and di-substituted amino groups, and protected derivatives thereof. The substituents themselves may be substituted, for example, a cycloalkyl substituent may itself have a halide substituent at one or more of its ring carbons. The term "optionally substituted" means optional substitution with the specified groups, radicals or moieties.

Compounds of the present disclosure also include crystalline and amorphous forms of those compounds, including, for example, polymorphs, pseudopolymorphs, solvates, hydrates, unsolvated polymorphs (including anhydrates), conformational polymorphs, and amorphous forms of the compounds, as well as mixtures thereof "Crystalline form" and "polymorph" are intended to include all crystalline and amorphous forms of the compound, including, for example, polymorphs, pseudopolymorphs, solvates, hydrates, unsolvated polymorphs (including anhydrates), conformational polymorphs, and amorphous forms, as well as mixtures thereof, unless a particular crystalline or amorphous form is referred to.

For the avoidance of doubt, it is intended herein that particular features (for example integers, characteristics, values, uses, formulae, compounds or groups) described in conjunction with a particular aspect, embodiment or example of the disclosure are to be understood as applicable to any other aspect, embodiment or example described herein unless incompatible therewith. Thus, such features may be used where appropriate in conjunction with any of the definition, claims or embodiments defined herein. All of the features disclosed in this specification (including any accompanying claims, abstract and drawings), and/or all of the steps of any method or process so disclosed, may be combined in any combination, except combinations where at least some of the features and/or steps are mutually exclusive. The present disclosure is not restricted to any details of any disclosed embodiments.

Photolithographic techniques (including 3D printing) offer excellent spatial and temporal resolution when building polymeric objects from liquid components. However, obtaining a diverse set of material properties (optical, electrical, mechanical, etc.) from such techniques remains a challenge. Moreover, materials with smooth gradients of properties from stiff to soft have not been achieved in the past. As such, the disclosure provides methods of patterning different regions of material (N>2) by varying the photo-dosage incident on a single liquid resin precursor. This multi-material framework, which is based, at least in part and without limitation, on three orthogonal crosslinking reactions, enables the multi-material 3D printing of materials with different Young's modulus and surface energy, and is useful for adhesive, coating, and additive manufacturing.

3D printing techniques based on vat photopolymerization (stereolithography [SLA], continuous liquid interface production [CLIP], Solution Mask Liquid Lithography [SMaLL], holographic and/or tomographic printing, etc.) are particularly attractive for fabricating complex polymeric structures. Though distinctions exist among the different technologies, in general, vat photopolymerization relies on the photoirradiation of a container of liquid photopolymer resin to build a solid object. The buoyant support provided by the resin enables high aspect ratio features of compliant structures with minimal deflection during printing. Further, these processes benefit from the spatial-temporal resolution of light; the scalability of projected photopatterns enables rapid build speeds without a loss in resolution. Despite these advantages, most of current materials and techniques employed for 3D printing are limited to the fabrication of material with single mechanical performance, while multi-material with voxelated controlled mechanical behaviors can open many new possibilities that are not accessible with other technologies. For example, voxelated controlled multimaterial can ensure optimum strength and maximum flaw tolerance. However, 3D printing of multimaterial with vat polymerization can be problematic. A straightforward method for obtaining discrete material regions in a single printed object is to use vat replacement techniques. Yet, each resin needs its own material stock and avoiding cross-contamination requires additional cleaning steps. Unfortunately, resin-replacement strategies remain incongruous with volumetric printing which rapidly builds monolithic parts during a single exposure.

Novel photochemistries that enable varying material properties from within a single resin chemistry overcome this limitation and maintain rapid multimaterial print speeds. Recent works precisely control the photoexposure dosage in materials based on (meth)acrylate homopolymerization to create smooth gradients for soft robotic actuators. However, these stiffness gradients are relatively shallow (Young's Modulus, E~2-15 kPa) and unstable due to the continued of polymerization of unreacted monomers. Multicomponent resins that possess orthogonal photochemical reactions yield binary materials with discrete variations in stiffness ($E_{hard}/E_{soft}$~10-10$^4$). As disclosed herein however, the crosslinking reactions initiate in response to different stimuli (multiple wavelengths or light and heat) to allow for localization of desired properties. Known multimaterial photochemistries include the cationic polymerization of epoxy ($\lambda$=365 nm) with free radical polymerization of acrylates ($\lambda$=405 nm), or the anionic thiol-Michael addition ($\lambda$=400-500 nm) with radical polymerization of acrylates ($\lambda$=365 nm). 3D printing such chemistries often requires additional considerations—the use of custom printers with multiple light sources and/or the addition of photochromic species to accentuate subtle absorption differences between photoinitiators that possess broad overlapping spectra. As an alternative, it was previously shown a novel dual-stage curing hybrid ink combining acrylate homopolymerization with aza-Michael reaction to achieve the single-vat grayscale DLP 4D printing.

However, all of these strategies result in materials of questionable stability. Specifically, the "soft" regions within these systems are intentionally "underpolymerized." These voxels contain unreacted groups that continue to crosslink and stiffen under exposure to ambient light or heat. Even without additional polymerization, such unbound species can escape the polymer network and the corresponding loss in mass may result in dimensional changes (loss of resolution) of the printed object.

This disclosure provides a multimaterial system with stable and voxel controlled mechanical properties based on three orthogonal reactions. Without wishing to be bound by any particular theory, the disclosure provides a sequential reaction scheme from compatible functional groups that participate in different polymerization mechanisms based on the applied stimulus. In some embodiments, this approach combines thiol-ene and thiol-epoxy step growth polymerizations with epoxy chain growth homopolymerization to form a polymer networks with disparate mechanical properties. By simply modulating the photoirradiation dosage, the resultant materials exhibit Young's moduli spanning three orders of magnitude (500 kPa<$E_{0.2-1\%}$<1.6 GPa) with smooth transitions from soft and stiff regions. Unlike other photopatterned gradients, the full consumption of crosslinking groups imparts environmental (i.e., photo and thermal) stability to the final products described herein after processing. In some embodiments, the platform described herein is used to holographically and/or tomographically print monolithic 3D multimaterial structures including a soft robotic Braille displays and a bio-inspired squid beak.

Solid polymeric materials possess long chains of macromolecules held together by sufficient interactions (i.e., physical entanglements, Van der Waal forces, electrostatic forces, hydrogen bonds, covalent bonds) between chains. In general, soft materials have weak interactions (e.g., loosely crosslinked flexible chains) while stiff materials exhibit strong interchain interactions (e.g., highly crosslinked, rigid linkages). Without wishing to be bound by any particular theory, when polymerizing a solid object from liquid precursors, reactions either add to a growing polymer backbone (increase molecular weight) or connect neighboring chains (network formation). Also without wishing to be bound by any particular theory, this distinction depends on the functionality ($f$), or the number of bonds a species forms during polymerization: species with $f=1$ are chain terminators, $f=2$ are chain extenders, and $f>2$ are crosslinkers. For a given chemistry, the functionality of the polymer building blocks and the extent of reaction (i.e., fraction of groups reacted) control the material's crosslink density and, consequently, E. For stable performance, and without wishing to be bound by any particular theory, it is assumed that all reactions will eventually approach 100% conversion. In some embodiments, the modulus can be controlled by varying the functionality of the reactants.

As described herein, the chemical design exploits the fundamental differences in stepwise addition (e.g., thiol-ene, thiol-epoxy) and chain growth (e.g., epoxy-epoxy) polymerizations. In stepwise addition, each participating chemical group reacts only once (monofunctional), often resulting in a homogeneous network. By comparison, in chain growth polymerization, each moiety forms two bonds (difunctional) and crosslinkers usually incorporate into the polymer heterogeneously. In some embodiments, a resin mixture described herein combines a trivinyl species, a thiol mixture (e.g., in a 9:1 molar ratio) of di- and tetra-thiol molecules, and a diepoxy (see FIG. 1A). In some embodiments, and without limitation, a 1:1:1 stoichiometric ratio between vinyl, thiol, and epoxy groups is used. This composition creates a three-stage curing chemistry: two stepwise addition reactions (thiol-ene and thiol-epoxy polymerizations) and a chain growth polymerization (epoxy homopolymerization). As described herein, in some embodiments, the first stage is a photoinitiated thiol-ene click reaction that rapidly forms a soft, percolated network during printing. In the second stage, applied heat (T~80° C.) continues to build a soft network based on the addition of thiol-epoxy crosslinks. During the higher temperature (T~120° C.) third stage, a thermal-latent base creates a stiff, highly crosslinked network based on the anionic homopolymerization of the rigid diepoxy species. The structure-property relationship in the polymers resin mixtures and/or the resulting crosslinked and/or polymerized resulting materials is described herein.

Without wishing to be bound by any particular theory, the stoichiometry described herein and sequencing of these reactions enables control over each stage of curing. In some embodiments, the photoexposure dosage ($H_e$) applied during printing dictates the % conversion (X) of vinyl and thiol groups. In the second stage, the remaining fraction (1-X) of thiols act as a limiting reagent and add mono-functionally to epoxy groups. Lastly, during the third stage, any residual epoxies (X) behave di-functionally and participate in chain-growth homopolymerization. Thus, without wishing to be bound by any particular theory, the photoexposure not only imparts the geometric shape of the printed object but ultimately dictates the local mechanical properties. Without wishing to be bound by any particular theory, at long photo-exposures (X~1), the material is stiff as the more densely crosslinked, glassy epoxy network dominates. At short photo-exposures (X~0) the large degree of chain extending thiol-epoxy reactions yields a loosely crosslinked, soft polymer. In either case, by the end of the final stage, the process consumes nearly all thiol and epoxy groups to restrict further reaction.

Rheological Behavior and FTIR

Figure 2A:
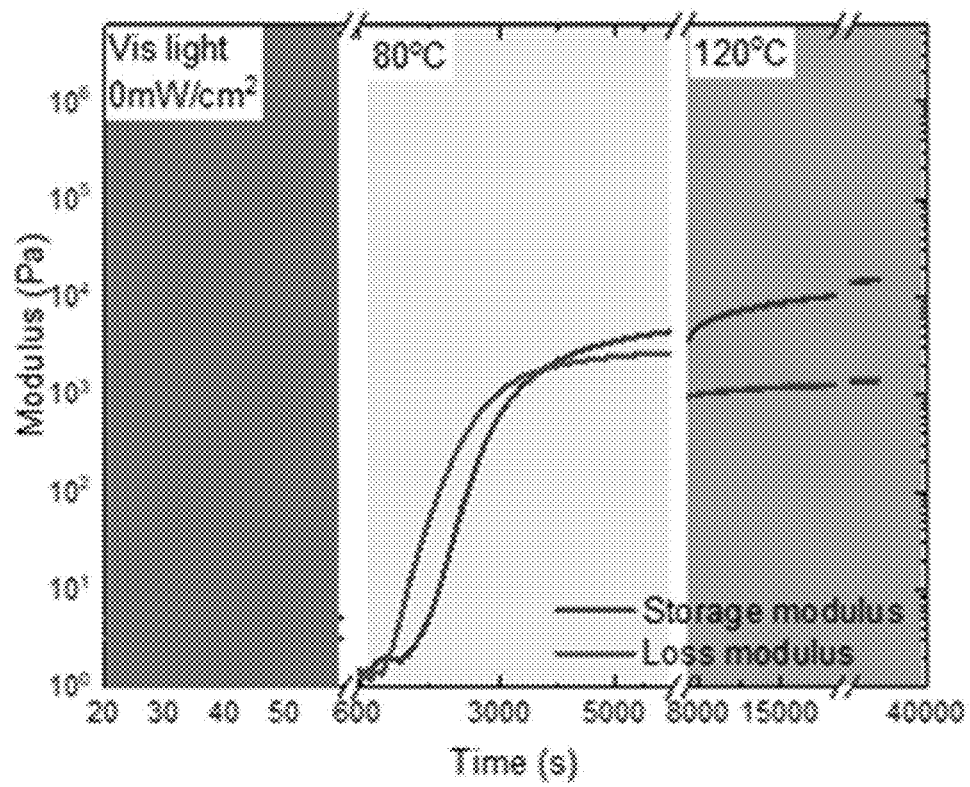
FIGS. 2A-2F illustrate the rheological and FTIR changes during a process described herein, as a function of light intensity and/or dosage, where the first step of the process includes light exposure, the second step includes exposure to an elevated temperature (i.e., 80° C.), and the third step includes exposure to an even more elevated temperature (i.e., 120° C.)
Figure 2B:
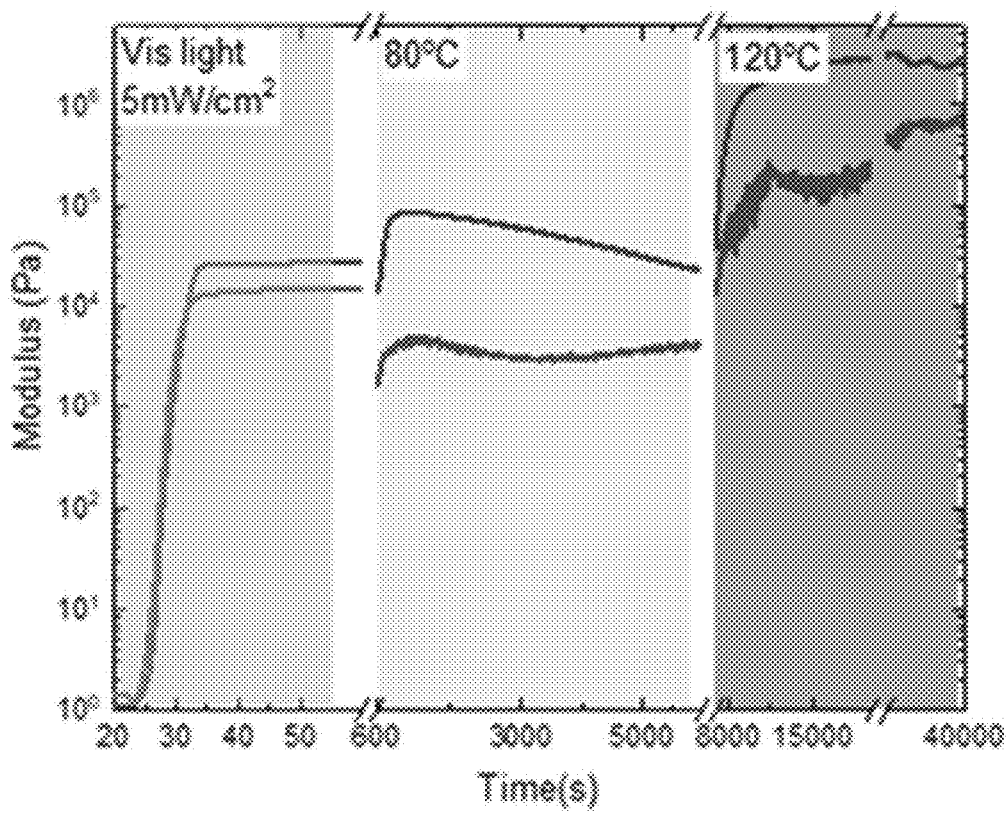
Figure 2C:
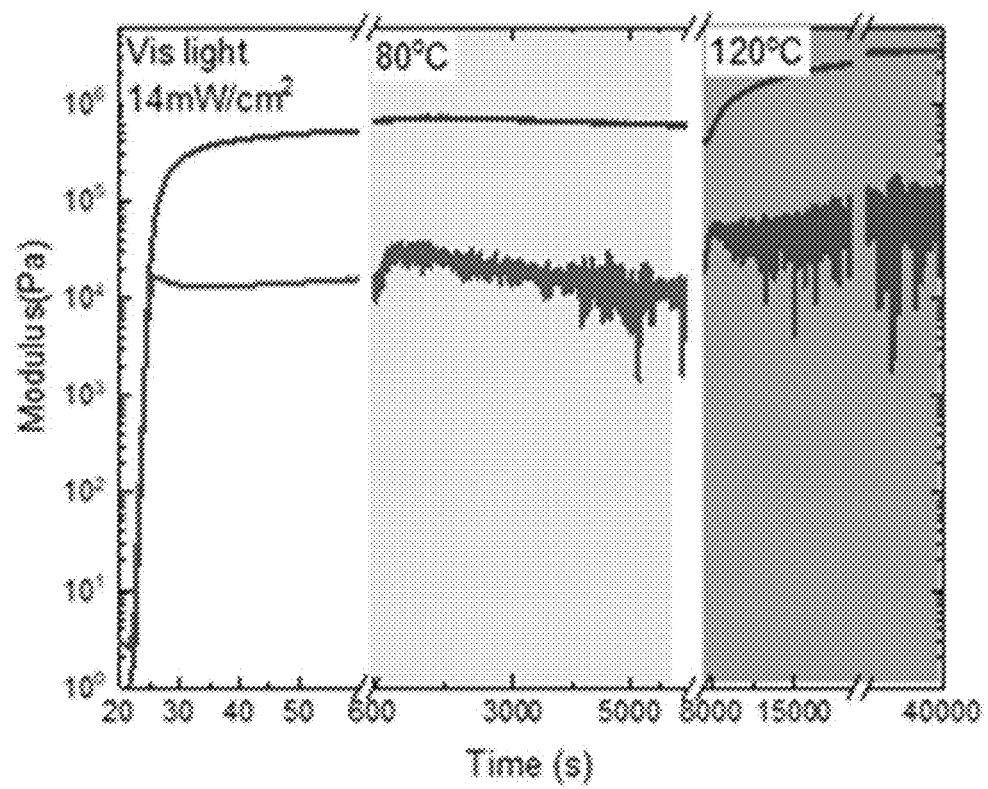

The rheological behavior and polymerization kinetics of the resin during processing were quantified using photo-/thermal-rheometry and Real-Time Fourier Transform Infrared (FT-IR) spectroscopy. Time-dependent storage modulus (G') and loss modulus (G") were evaluated for the first stage thiol-ene photopolymerization with varied degree of photo-exposure at 25° C. and followed by sequential the thiol-epoxy addition at 80° C. and the epoxy homopolymerization at 120° C. (FIG. 2A-2C). As shown in FIG. 2A, the low viscosity liquid resin is stable without any photodosage. Upon heating at 80° C., the G' and G" rapidly increase and ultimately show crossover in moduli at ~1 hour indicating the loosely crosslinked soft polymer gelled as the result of the thiol-epoxy polymerization occurred at 80° C. The G" slowly increasing and eventually reach to a plateau at $10^4$ MPa for G' at 120° C. corresponding to further postcuring of the resultant polymer. Unlike 0 irradiation system, FIG. 2B shows the rheological behavior with the same resin system at an initial photodosage of 62.5 mJ·cm$^{-2}$. Upon visible light irradiation, the storage modulus quickly exceeded the loss modulus, an indication of gelation, within 10 s of irradiation, which, without wishing to be bound by any particular theory, indicated the printability of the resin system. As the light turns off at 12.5 s, the termination step immediately quenched down the radical thiol-ene reaction as noted by the plateau of the modulus (FIG. 2B). The second increase of the modulus in the second stage corresponds to the thiol-epoxy reaction whereas the residual epoxy homopolymerized at third stage as indicated by the sharp increase in modulus at 120° C. The resultant storage modulus, G=$10^6$ Pa, is much higher than the one with 0 mJ·cm$^{-2}$ dosage. In the last case, whereas resin was exposed to an initial photodosage of 175 mJ·cm$^{-2}$, the modulus shows dramatic increase in the first stage as thiol-ene photopolymerization happened upon irradiation and the modulus reaches a plateau in the first stage suggesting quantitative reaction of the thiol-ene photopolymerization. Consequential, no thiol functional group left for second stage and therefore modulus stays constant at the second stage. As the epoxy homopolymerization proceed at elevated temperature (120° C.), both G' and G" increase rapidly and reach to the plateau at 5 MPa suggesting the formation of the highly crosslinked stiff network. These rheological results agree with the measured conversion of the crosslinkable groups as monitored via FT-IR.

Mechanical Characterizations

Figure 3A:
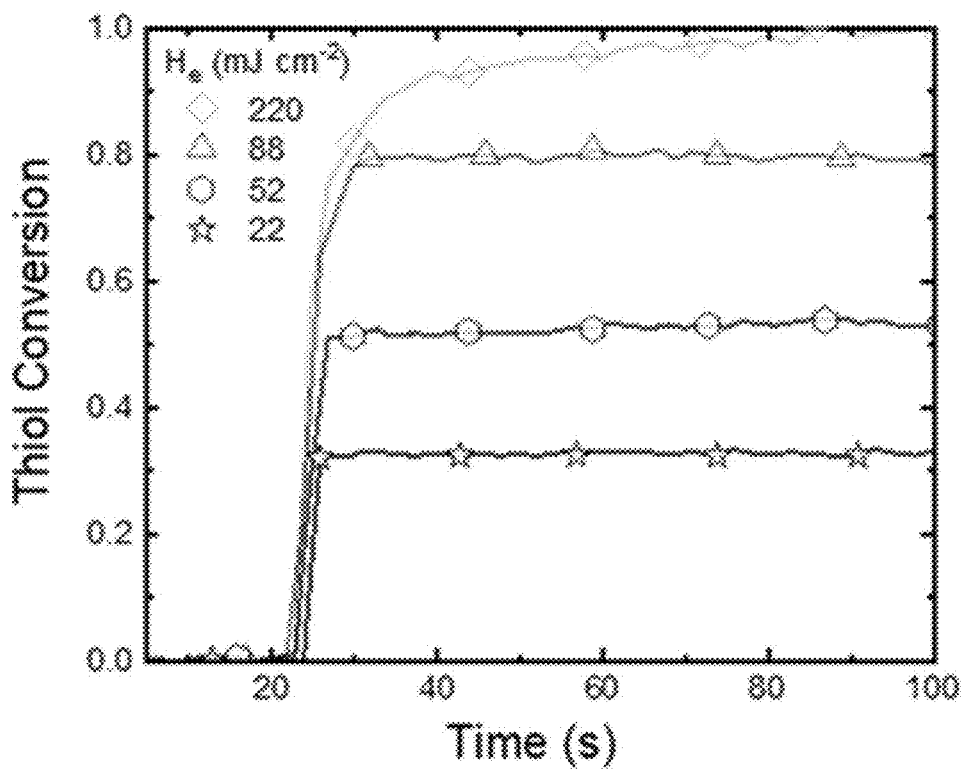
FIG. 3A illustrates thiol conversion as a function of time for various photodosages—higher photodosage results in faster thiol conversion.
Figure 3B:
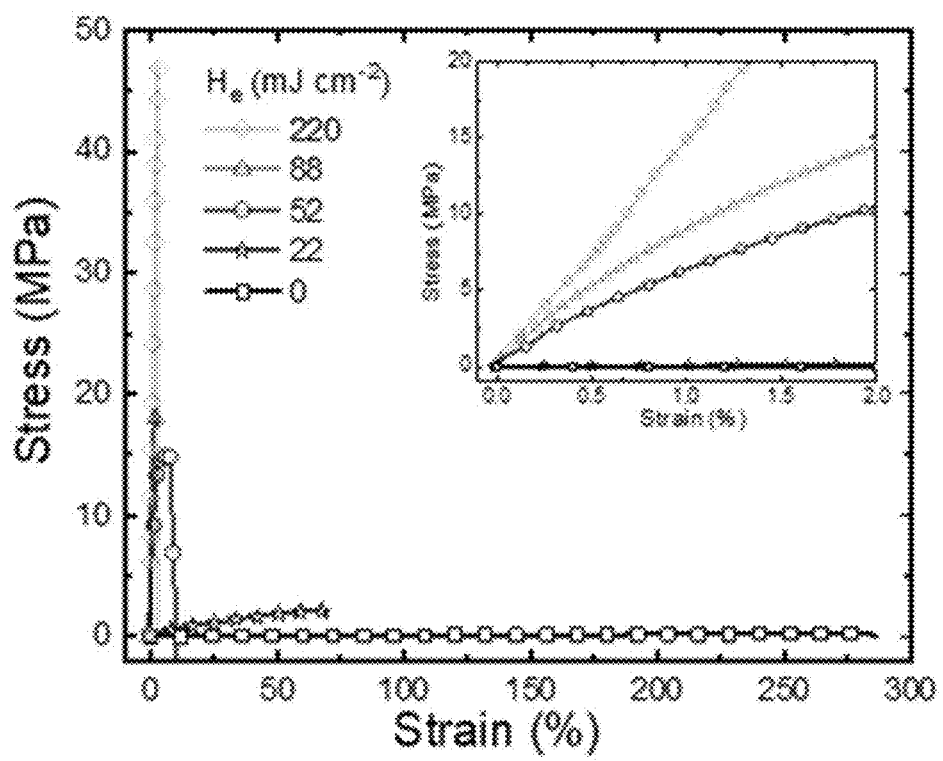
FIG. 3B illustrates stress as a function of strain for various photodosages.
Figure 3C:
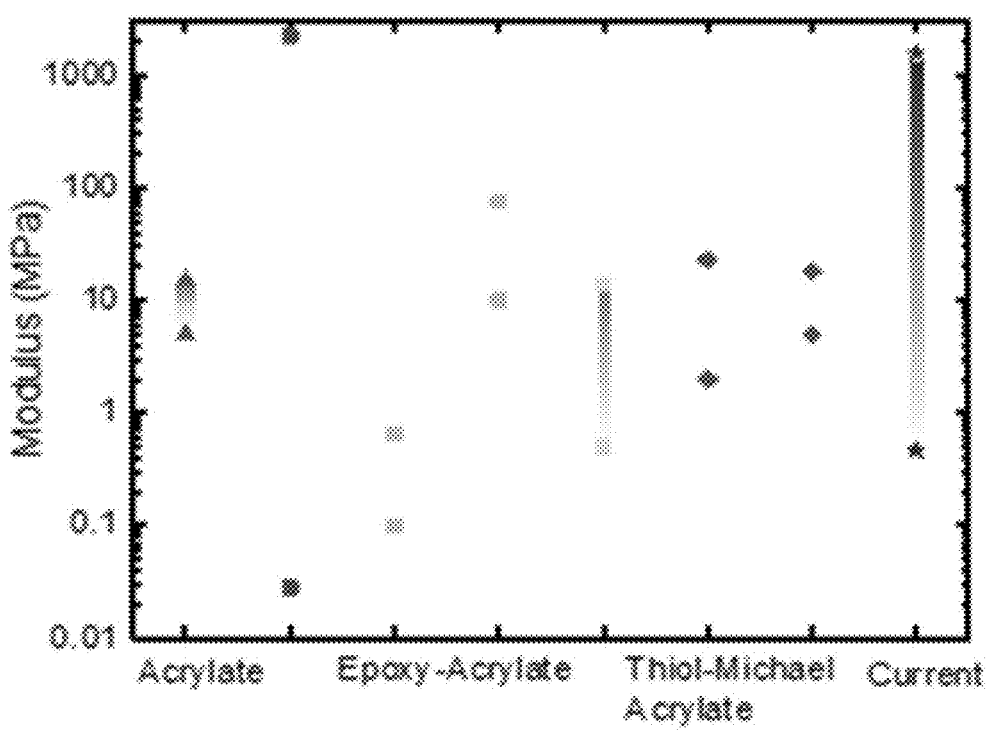
FIG. 3C illustrates the range of modulus covered by previously known mono or bi material systems compared to the range of modulus covered by the systems described herein.
Figure 3D:
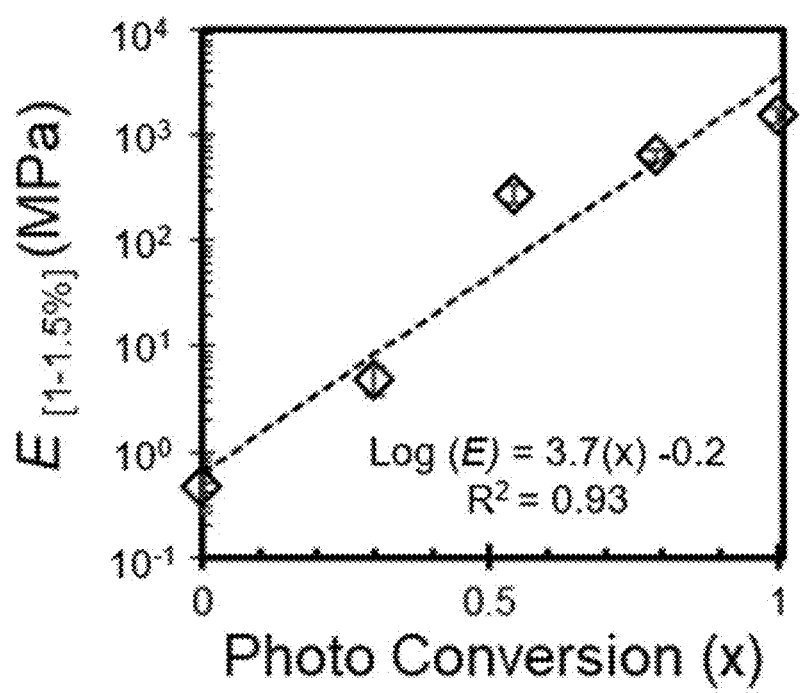
FIG. 3D illustrates $E_{[1-1.5\%]}$ as a function of photoconversion (X)

The mechanical properties resulting from printing with varied initial photodosages were also characterized (FIG. 3A-3D). Tensile test specimens were printed from a commercialized Amber DLP printer using 0 to 15 s layer curing times. The resultant polymer was cured at 80° C. for 1 hr and followed by postcuring at 120° C. overnight. The initial photodosage, and therefore the chemical composition of the polymer network, dominate the outcomes of the stress-strain behavior (FIG. 3B). With 0 mW/cm$^2$ of photodosage, loosely crosslinked thiol-epoxy network was formed and yield a soft elastic material behavior with 300% elongation, which is 30 times longer than that prepared with 250 mJ·cm$^{-2}$ photodosage. In contrast, with increasing the initial photodosage, the epoxy homopolymerization content increase in the polymer network and thus led to a much stiffer material. For example, with 100 mJ·cm$^{-2}$ of initial photodosage, the resultant material shows a Young's modulus of 1000 MPa. With 250 mJ·cm$^{-2}$ of initial photodosage, the network, composes with a dual-stage thiol-ene and epoxy homopolymerization, shows stiffer mechanical properties with Young's modulus of 2 GPa, which is around three order of magnitude higher than that of the soft region. In this system, the key feature is that the thiol conversion in the first stage is controlled by the initial photodosage and further impact on the mechanical properties of the final product. Therefore, the vinyl conversion/thiol conversion in the first stage is directly correlates with the stiffness/Young's modulus of the final network. As shown in FIG. 3D, the modulus of the final product is proportional to the vinyl conversion. Therefore, this linear correlation can serve as a way to predict the modulus and tailor the first stage reaction to a desired extent. Since the thiol conversion can be tuned from 0 to full conversion by photodosage, another advantage with this system is that the modulus of the resultant film will show graduate change based on the pattern of the photodosage. Unlike most of the single or bi-material systems (FIG. 3C), which has distinct region of soft and stiff region, this novel three stage curing stage allows graduate change of the mechanical properties and provide relative large gradient of the modulus difference.

The multimaterial system disclosed herein provides stable mechanical properties under light and elevated temperature since all reactive moieties are consumed by the thermal curing process. In some embodiments, the samples after thermal treatment were exposed under light and heated at 120° C. for 1 hr. After extended light and thermal treatment, the materials show similar stress-strain curve as its pristine counter-samples, indicating the extreme stability of the system.

In some embodiments, the disclosure provides a method of generating a modulus gradient in a polymeric material, the method comprising subjecting an initial precursor resin mixture to a polymerization or crosslinking stimulus, wherein the initial precursor resin mixture comprises one or more monomers, the one or more monomers comprising at least three different polymerizable or crosslinkable moieties. In some embodiments, the method further comprises generating one or more intermediate resin mixtures, wherein the processing further comprises subjecting the one or more intermediate resin mixtures to one or more polymerization and/or crosslinking stimuli. In some embodiments, the one or more intermediate resin mixtures are partially crosslinked or partially polymerized.

In some embodiments, the initial precursor resin mixture comprises one or more monomers, the one or more monomers comprising a first polymerizable and/or crosslinkable moiety, a second polymerizable and/or crosslinkable moiety, and a third polymerizable and/or crosslinkable moiety. In some embodiments, the molar ratio between the first, the second, and the third polymerizable and/or crosslinkable moiety is about 1:1:1. In some embodiments, the molar ratio between the first, the second, and the third polymerizable and/or crosslinkable moiety is about x:1:1, where x is about 0.01, about 0.02, about 0.03, about 0.04, about 0.05, about 0.06, about 0.07, about 0.08, about 0.09, about 0.10, about 0.11, about 0.12, about 0.13, about 0.14, about 0.15, about 0.16, about 0.17, about 0.18, about 0.19, about 0.20, about 0.21, about 0.22, about 0.23, about 0.24, about 0.25, about 0.26, about 0.27, about 0.28, about 0.29, about 0.30, about 0.31, about 0.32, about 0.33, about 0.34, about 0.35, about 0.36, about 0.37, about 0.38, about 0.39, about 0.40, about 0.41, about 0.42, about 0.43, about 0.44, about 0.45, about 0.46, about 0.47, about 0.48, about 0.49, about 0.50, about 0.51, about 0.52, about 0.53, about 0.54, about 0.55, about 0.56, about 0.57, about 0.58, about 0.59, about 0.60, about 0.61, about 0.62, about 0.63, about 0.64, about 0.65, about 0.66, about 0.67, about 0.68, about 0.69, about 0.70, about 0.71, about 0.72, about 0.73, about 0.74, about 0.75, about 0.76, about 0.77, about 0.78, about 0.79, about 0.80, about 0.81, about 0.82, about 0.83, about 0.84, about 0.85, about 0.86, about 0.87, about 0.88, about 0.89, about 0.90, about 0.91, about 0.92, about 0.93, about 0.94, about 0.95, about 0.96, about 0.97, about 0.98, about 0.99, or about 1. In some embodiments, the molar ratio between the first, the second, and the third polymerizable and/or crosslinkable moiety is about x:y:z, where y:z is selected from between about 0.01:0.99 and about 0.99:0.01, and where x is about 0.01, about 0.02, about 0.03, about 0.04, about 0.05, about 0.06, about 0.07, about 0.08, about 0.09, about 0.10, about 0.11, about 0.12, about 0.13, about 0.14, about 0.15, about 0.16, about 0.17, about 0.18, about 0.19, about 0.20, about 0.21, about 0.22, about 0.23, about 0.24, about 0.25, about 0.26, about 0.27, about 0.28, about 0.29, about 0.30, about 0.31, about 0.32, about 0.33, about 0.34, about 0.35, about 0.36, about 0.37, about 0.38, about 0.39, about 0.40, about 0.41, about 0.42, about 0.43, about 0.44, about 0.45, about 0.46, about 0.47, about 0.48, about 0.49, about 0.50, about 0.51, about 0.52, about 0.53, about 0.54, about 0.55, about 0.56, about 0.57, about 0.58, about 0.59, about 0.60, about 0.61, about 0.62, about 0.63, about 0.64, about 0.65, about 0.66, about 0.67, about 0.68, about 0.69, about 0.70, about 0.71, about 0.72, about 0.73, about 0.74, about 0.75, about 0.76, about 0.77, about 0.78, about 0.79, about 0.80, about 0.81, about 0.82, about 0.83, about 0.84, about 0.85, about 0.86, about 0.87, about 0.88, about 0.89, about 0.90, about 0.91, about 0.92, about 0.93, about 0.94, about 0.95, about 0.96, about 0.97, about 0.98, or about 0.99. In some embodiments, the first polymerizable and/or crosslinkable moiety is an alkene moiety, e.g., and without limitation, vinyl, allyl, acrylate, methacrylate, or the like. In some embodiments, the first polymerizable and/or crosslinkable moiety is vinyl. In some embodiments, the second polymerizable and/or crosslinkable moiety is a nucleophilic group, e.g., and without limitation, thiol. In some embodiments, the second polymerizable and/or crosslinkable moiety is thiol. In some embodiments, the third polymerizable and/or crosslinkable moiety is a strained three membered ring heterocycle, e.g., and without limitation, epoxy or thiirane. In some embodiments, the third polymerizable and/or crosslinkable moiety is epoxy.

In one embodiment, a polymerizable or crosslinkable moiety is an alkene group. In one embodiment, a polymerizable or crosslinkable moiety is a terminal alkene group. In one embodiment, a polymerizable or crosslinkable moiety is a thiol group. In one embodiment, a polymerizable or crosslinkable moiety is an epoxy group.

In some embodiments, the one or more intermediate resin mixtures comprise at least one group selected from —S— and —S—CH$_2$—CH(OH)—. In some embodiments, the one or more intermediate resin mixtures comprise at least one group selected from —S—, —S—CH₂—CH(OH)—, and —CH₂—CH(—)—O—. In some embodiments, the polymeric material comprises at least one group selected from —S—, —S—CH₂—CH(OH)—, and —CH₂—CH(—)—O—. In some embodiments, the polymeric material comprises the groups —S—, —S—CH₂—CH(OH)—, and —CH₂—CH(—)—O—.

In some embodiments, the one or more monomers are selected from a monofunctional monomer, a bifunctional monomer, a trifunctional monomer, and a tetrafunctional monomer. In some embodiments, the one or more monomers are selected from BisDE, TATATO, GDMP, and PETMP.

In some embodiments, the one or more monomers are selected from BisDE, TATATO, GDMP, PETMP, allyl glycidyl ether, 3,4-Epoxycyclohexylmethyl 3,4-epoxycyclohexanecarboxylate, tris 2-(acryloyloxy) ethyl isocyanurate, 1,3,5-triacryloylhexahydro-1,3,5-triazine, pentaerythritol tetra(3-mercaptopropionate), trimethylolpropane tris(3-mercaptopropionate), and 1,6-hexanedithiol. In some embodiments, the one or more monomers are selected from epoxy monomers such as allyl glycidyl ether, 1,3-butadiene diepoxide, diglycidyl 1,2-cyclohexanedicarboxylate, 1,2-epoxy-5-hexene, 2-methyl-2-vinyloxirane, resorcinol diglycidyl ether, tris(2,3-epoxypropyl) isocyanurate, 3,4-Epoxycyclohexylmethyl 3,4-epoxycyclohexanecarboxylate. In some embodiments, the one or more monomers are selected from any epoxy, glycidyl ether, and/or epoxycyclohexanecarboxylate known in the art. In some embodiments, the one or more monomers are selected from alkene monomers such as diallyl ether, diallyl terephthalate, diallyl carbonate, acrylates, methacrylates, di-norbornenes, tri-norbornenes, 2,4,6-triallyloxy-1,3,5-triazine, tris 2-(acryloyloxy) ethyl isocyanurate, and 1,3,5-triacryloylhexahydro-1,3,5-triazine. In some embodiments, the one or more monomers are selected from thiol monomers such as 2,5-dimercaptomethyl-1,4-dithiane, 2,3-dimercapto-1-propanol, 2-mercapto-ethylsulfide, 2,3-(dimercaptoethylthio)-1-mercaptopropane, 1,2,3-trimercaptopropane, ethylene glycol bis(thioglycolate), ethylene glycol bis(3-mercaptopropionate), pentaerythritol tetra(3-mercaptopropionate), trimethylolpropane tris(3-mercaptopropionate), pentaerythritol tetra(2-mercaptoacetate), trimethylolpropane tris(2-mercaptoacetate), 1,6-hexanedithiol, 1,2-benzenedithiol, 1,3-benzenedithiol, isophorone diurethane thiol, and the like.

In some embodiments, the one or more monomers include one or more terminal groups selected from hydrogen, optionally substituted alkyl, optionally substituted heteroalkyl, optionally substituted alkenyl, optionally substituted alkynyl, optionally substituted cycloalkyl, optionally substituted heterocycloalkyl, optionally substituted aryl, optionally substituted arylalkyl, optionally substituted heteroaryl, optionally substituted heteroarylalkyl, optionally substituted acrylate, optionally substituted methacrylate, optionally substituted styrene, optionally substituted epoxide, optionally substituted thiirane, optionally substituted glycidyl, optionally substituted lactone, optionally substituted carbonate, hydroxy, halo, cyano, trifluoromethyl, trifluoromethoxy, nitro, and trimethylsilanyl. In some embodiments, the one or more terminal groups are selected from alkenyl, cycloalkenyl, optionally substituted aryl, and optionally substituted heteroaryl. In some embodiments, the one or more terminal groups are selected from optionally substituted acrylate, optionally substituted methacrylate, optionally substituted vinyl, optionally substituted epoxide, optionally substituted thiirane, optionally substituted glycidyl, and optionally substituted allyl. In some embodiments, the one or more terminal groups are selected from vinyl, allyl, thiol, alcohol, epoxide, thiirane, glycidyl, acrylate, and methacrylate. In some embodiments, the one or more terminal groups are selected from optionally substituted thiophenyl, optionally substituted thiopyranyl, optionally substituted thienothiophenyl, and optionally substituted benzothiophenyl. In some embodiments, the one or more terminal groups are selected from vinyl, thiol, and epoxide (i.e., epoxy).

In some embodiments, the one or more monomers include one or more compounds comprising a polymerizable or crosslinkable group selected from optionally substituted alkenyl, optionally substituted cycloalkenyl, optionally substituted alkynyl, optionally substituted acrylate, optionally substituted methacrylate, optionally substituted styrene, optionally substituted epoxide, optionally substituted thiirane, optionally substituted glycidyl, optionally substituted lactone, optionally substituted lactam, and optionally substituted carbonate. In some embodiments, the polymerizable or crosslinkable group is selected from vinyl, allyl, epoxide, thiol, thiirane, glycidyl, acrylate, and methacrylate.

In some embodiments, the initial precursor resin mixture comprises one or more radical photoinitiator selected from 2,2-dimethoxy-1,2-diphenylethan-1-one, bis(2,4,6-trimethylbenzoyl)-phenylphosphineoxide, 1-hydroxycyclohexyl benzophenone, trimethyl-benzoyl-diphenyl-phosphine-oxide, but any radical photoinitiator known in the art can be used without limitation.

In some embodiments, the initial precursor resin mixture comprises one or more base catalysts selected from imidazole, allyl 1H-imidazole-1-carboxylate, isopropyl 1H-imidazole-1-carboxylate, 1-(3-aminopropyl)imidazole, 1-(diethoxymethyl)imidazole, Technicure LC-80, LC-100, Technicure® D, D-5, D-10, D-44, Nano, but any base catalyst known in the art can be used without limitation.

In some embodiments, the one or more polymerization and/or crosslinking stimuli are selected from subjecting the initial precursor resin mixture and/or any of the intermediate resin mixtures to a light source and/or a raised temperature. In some embodiments, a polymerization and/or crosslinking stimulus is subjecting the initial precursor resin mixture to a light source. In some embodiments, the polymerization and/or crosslinking stimuli include subjecting any of the intermediate resin mixtures to at least a first raised temperature. In some embodiments, the polymerization and/or crosslinking stimuli include subjecting any of the intermediate resin mixtures to at least a first raised temperature and a second raised temperature. In some embodiments, the polymerization and/or crosslinking stimuli are selected from subjecting any of the intermediate resin mixtures to at least two different raised temperatures.

In some embodiments, a first raised temperature is between about 50° C. and about 150° C. In some embodiments, a first raised temperature is between about 50° C. and about 100° C. In some embodiments, a first raised temperature is between about 75° C. and about 85° C. In some embodiments, a first raised temperature is about 50° C. In some embodiments, a first raised temperature is about 55° C. In some embodiments, a first raised temperature is about 60° C. In some embodiments, a first raised temperature is about 65° C. In some embodiments, a first raised temperature is about 70° C. In some embodiments, a first raised temperature is about 75° C. In some embodiments, a first raised temperature is about 80° C. In some embodiments, a first raised temperature is about 85° C. In some embodiments, a first raised temperature is about 90° C. In some embodiments, a first raised temperature is about 95° C. In some embodiments, a first raised temperature is about 100° C. In some embodiments, a first raised temperature is between about 100° C. and about 150° C. In some embodiments, a first raised temperature is about 80° C., about 90° C., about 100° C., about 110° C., about 120° C., about 130° C., about 140° C., or about 150° C.

In some embodiments, a second raised temperature is between about 100° C. and about 150° C. In some embodiments, a second raised temperature is between about 115° C. and about 125° C. In some embodiments, a second raised temperature is about 100° C. In some embodiments, a second raised temperature is about 105° C. In some embodiments, a second raised temperature is about 110° C. In some embodiments, a second raised temperature is about 115° C. In some embodiments, a second raised temperature is about 120° C. In some embodiments, a second raised temperature is about 125° C. In some embodiments, a second raised temperature is about 130° C. In some embodiments, a second raised temperature is about 135° C. In some embodiments, a second raised temperature is about 140° C. In some embodiments, a second raised temperature is about 145° C. In some embodiments, a second raised temperature is about 150° C. In some embodiments, a second raised temperature is about 155° C. In some embodiments, a second raised temperature is about 160° C. In some embodiments, a second raised temperature is about 165° C. In some embodiments, a second raised temperature is about 170° C. In some embodiments, a second raised temperature is about 175° C.

In some embodiments, a ramp rate to the first raised temperature or to the second raised temperature is between about 0.5° C./min and about 10° C./min. In some embodiments, a ramp rate to the first raised temperature or to the second raised temperature is between about 0.5° C./min and about 20° C./min. In some embodiments, a ramp rate to the first raised temperature or to the second raised temperature is about 0.5° C./min, about 1° C./min, about 2° C./min, about 5° C./min, about 10° C./min, or about 20° C./min. In some embodiments, a ramp rate to the first raised temperature or to the second raised temperature is about 0.5° C./min. In some embodiments, a ramp rate to the first raised temperature or to the second raised temperature is about 1° C./min. In some embodiments, a ramp rate to the first raised temperature or to the second raised temperature is about 1.5° C./min. In some embodiments, a ramp rate to the first raised temperature or to the second raised temperature is about 2° C./min. In some embodiments, a ramp rate to the first raised temperature or to the second raised temperature is about 2.5° C./min. In some embodiments, a ramp rate to the first raised temperature or to the second raised temperature is about 3° C./min. In some embodiments, a ramp rate to the first raised temperature or to the second raised temperature is about 3.5° C./min. In some embodiments, a ramp rate to the first raised temperature or to the second raised temperature is about 4° C./min. In some embodiments, a ramp rate to the first raised temperature or to the second raised temperature is about 4.5° C./min. In some embodiments, a ramp rate to the first raised temperature or to the second raised temperature is about 5° C./min. In some embodiments, a ramp rate to the first raised temperature or to the second raised temperature is about 6° C./min. In some embodiments, a ramp rate to the first raised temperature or to the second raised temperature is about 7° C./min. In some embodiments, a ramp rate to the first raised temperature or to the second raised temperature is about 8° C./min. In some embodiments, a ramp rate to the first raised temperature or to the second raised temperature is about 9° C./min. In some embodiments, a ramp rate to the first raised temperature or to the second raised temperature is about 10° C./min.

In some embodiments, the initial precursor resin mixture further comprises a photoinitiator. In some embodiments, the modulus is selected from Young's modulus (E), shear modulus or modulus of rigidity (G), and bulk modulus (K). In some embodiments, the modulus is Young's modulus (E). In some embodiments, the modulus is storage modulus and/or loss modulus. In some embodiments, the method is a 3D printing method.

In some embodiments, the initial precursor resin mixture further comprises a photoinitiator. The photoinitiator chemically initiates the polymerization of a photoactive polymerizable material. The photoinitiator generally should offer a source of species that initiate polymerization of the particular photoactive polymerizable material, e.g., photoactive monomer. Typically, from about 0.1 to about 20 vol. % photoinitiator provides desirable results. A variety of photoinitiators known to those skilled in the art and available commercially are suitable for use as described herein, for example, those comprising a phosphine oxide group, such as diphenyl(2,4,6-trimethylbenzoyl)phosphine oxide, disclosed in U.S. Pat. No. 6,780,546 (Trentler et al.), issued Aug. 24, 2004, incorporated herein by reference. In some embodiments, the photoinitiator is sensitive to light at wavelengths available from conventional laser sources, e.g., the blue and green lines of Ar$^+$ (458, 488, 514 nm) and He—Cd lasers (442 nm), the green line of frequency doubled YAG lasers (532 nm), and the red lines of He—Ne (633 nm), Kr$^+$ lasers (647 and 676 nm), and various diode lasers (290 to 900 nm). In some embodiments, the free radical photoinitiator bis($\eta$-5-2,4-cyclopentadien-1-yl)bis[2,6-difluoro-3-(1H-pyrrol-1-yl)phenyl]titanium can be used. In some embodiments, the free-radical photoinitiator 5,7-diiodo-3-butoxy-6-fluorone can be used. In some embodiments, this photoinitiator requires a co-initiator. Free-radical photoinitiators of dye-hydrogen donor systems can also be used. Examples of suitable dyes include eosin, rose bengal, erythrosine, and methylene blue, and suitable hydrogen donors include tertiary amines such as n-methyl diethanol amine. In the case of cationically polymerizable components, a cationic photoinitiator is used, such as a sulfonium salt or an iodonium salt. These cationic photoinitiator salts absorb predominantly in the UV portion of the spectrum, and are therefore typically sensitized with a sensitizer or dye to allow use of the visible portion of the spectrum. An example of an alternative visible cationic photoinitiator is ($\eta_5$-2,4-cyclopentadien-1-yl) ($\eta_6$-isopropylbenzene)-iron(II) hexafluorophosphate. In some embodiments, photoinitiators used herein are sensitive to ultraviolet and visible radiation of from about 200 nm to about 800 nm. In some embodiments, other additives can be used in the photoimageable system, e.g., inert diffusing agents having relatively high or low refractive indices.

In some embodiments, a polymer article described herein may also include additives such as plasticizers for altering the properties of the article of the present disclosure including the melting point, flexibility, toughness, diffusibility of the monomers and/or oligomers, and ease of processability. Examples of suitable plasticizers include dibutyl phthalate, poly(ethylene oxide) methyl ether, N,N-dimethylformamide, etc. Plasticizers differ from solvents in that solvents are typically evaporated whereas plasticizers are meant to remain in the article.

Other types of additives that may be used in a resin mixture and article of the present disclosure are inert diffusing agents having relatively high or low refractive indices. Other additives that may be used in a resin mixture and article of the present disclosure include: pigments, fillers, nonphotoinitiating dyes, antioxidants, bleaching agents, mold releasing agents, antifoaming agents, infrared/microwave absorbers, surfactants, adhesion promoters, etc.

Suitable polymerization retarders and inhibitors for use herein include but are not limited to one or more of the following: for free radical polymerizations, various phenols including butylated hydroxytoluenes (BHT) such as 2,6-di-t-butyl-p-cresol, p-methoxyphenol, diphenyl-p-benzoquinone, benzoquinone, hydroquinone, pyrogallol, resorcinol, phenanthraquinone, 2,5-toluquinone, benzylaminophenol, p-dihydroxybenzene, 2,4,6-trimethylphenol, etc.; various nitrobenzenes including o-dinitrobenzene, p-dinitrobenzene, m-dinitrobenzene, etc.; N-phenyl-1-naphthylamine, N-phenyl-2-naphthylamine, cupferron, phenothiazine, tannic acid, p-nitrosamine, chloranil, aniline, hindered anilines, ferric chloride, cupric chloride, triethylamine, etc. These polymerization retarders and inhibitors can be used individually (e.g., a single retarder) or in combinations of two or more, e.g., a plurality of retarders. The same principles can be applied to ionic polymerizations. For example, it is known that chloride anions can behave as retarders or inhibitors for cationic polymerizations, depending on both the monomer type and the concentration of the chloride anions. Typically, functionalities that are basic or mildly nucleophilic behave as retarders and inhibitors for cationic polymerizations; whereas for anionic polymerizations, slightly acidic and mildly electrophilic functionalities behave as retarders and inhibitors.

In some embodiments, polymerization reactions involving both polymerization retarders and inhibitors should lead to termination reactions. If reinitiation occurs to any appreciable degree, then the agent is typically considered a chain transfer agent. For example, triethylamine can be used as a chain transfer agent since it is also capable of reinitiating some radical polymerizations; however, when the reinitiation is slow compared to termination reactions, then even chain transfer agents can be considered potential polymerization retarders or inhibitors for the purposes of the present disclosure. Suitable chain transfer agents for use herein include but are not limited to: triethylamine, thioethers, compounds having carbonate groups, ethers, toluene derivatives, allyl ethers, etc. Chain transfer agents that are mildly retarding can be desirable because these can be incorporated into the matrix and enable attachment of the photopolymer and photoinitiator radicals to the matrix.

In addition to retarders, inhibitors and/or chain transfer agents, metastable reactive centers and light labile phototerminators can also be used to control polymerization reactions described herein of the appropriate reactivity. For example, nitroxyl radicals can be added as a metastable reactive center. Nitroxyl radicals create pseudo-living radical polymerizations with certain monomers. Thus, the nitroxyl radical initially behaves as a terminating agent (such as an inhibitor), however, depending on the temperature at which the polymerization is carried out, the termination is reversible. Other potential metastable reactive center include triphenylmethyl radicals, dithioesters are typically used in Reversible Addition-Fragmentation chain Transfer (RAFT) polymerizations, that can behave as appropriate metastable reactive centers, etc. As for ionic polymerizations, there are stable ions that are able to perform the same function, as the example nitroxyl radicals above.

Use of a light labile phototerminator provides the ability to control the activity of the reactive species with light (as opposed to heat as described herein). A light labile phototerminator is any molecule capable of undergoing reversible termination reactions using a light source. For example, certain cobaltoxime complexes can be used to photoinitiate radical polymerizations, and yet, also terminate the same radical polymerizations. Dithioesters are also suitable as light labile phototerminators because they have the ability to reversibly form radicals with appropriate wavelengths of light. Under the appropriate conditions and with appropriate monomers (such as styrenes and acrylates), it is possible to restart the polymerization by irradiating with a photoinitiating light source (e.g., recording light). Thus, as long as a given volume is exposed to a photoinitiating light source, radical polymerization continues, whereas when the photoinitiating light is off or absent, the polymerizations are terminated. Metastable reactive centers and light labile phototerminators can also be used to control ionic (e.g., cationic or anionic initiated) polymerization reaction systems according to the present disclosure.

For ionic chain reactions (e.g., cationic and anionic initiated polymerization reactions), counter ion and solvent effects can be used to control polymerization by terminating the reactive center. Ionic systems are sensitive to solvent conditions because the solvent (or the support matrix) determines the proximity of the counter ion to the reactive center. For instance, in a nonpolar medium the counter ion will be very closely associated with the reactive center; in a polar medium the counter ion may become freely dissociated. The proximity of the counter ion can determine polymerization rate as well as the potential for collapse with the counter ion (depending on the counter ion used). For example, if one uses a cationic polymerization with a nonpolar support matrix and chloride anion as the counter ion, there is a better probability of terminating the reaction due to collapse of the counter ion.

Certain monomer mixtures can also behave in a manner that can control the degree or rate of polymerization. For example, if a small amount of alpha methyl styrene is present in an acrylate polymerization, the acrylate will add into the alpha methyl styrene and the styrene will not substantially reinitiate polymerization of the acrylate, e.g., the alpha methyl styrene retards the rate of acrylate polymerization. Additionally, the alpha methyl styrene is slow to polymerize with itself, and thus behaves as a polymerization retarder/inhibitor even though it is a comonomer. In the case of ionic polymerizations; using, for example, vinyl anisole in a cationic vinyl ether polymerization results in retarded rates of polymerization because the vinyl anisole does not efficiently reinitiate vinyl ether polymerization.

The disclosure also provides a polymeric material having at least one modulus gradient in a spatial direction, the polymeric material made by a method described herein.

The disclosure also provides a polymeric material having a modulus gradient over one spatial direction, wherein modulus is measured in a plurality of voxels. Voxel refers to a volumetric pixel, or the smallest unit of discrete 3D space that can be selectively illuminated, e.g., selectively illuminated by a light source such as a 3D printer light source. Without wishing to be bound by any particular theory, in some embodiments, a voxel is about 800 nm in each dimension (2×405 nm excitation due to diffraction limit).

In some embodiments, the modulus is selected from Young's modulus (E), shear modulus or modulus of rigidity (G), and bulk modulus (K). In some embodiments, the modulus is Young's modulus (E). In some embodiments, the modulus is storage modulus and/or loss modulus. In some embodiments, the modulus ranges from about $10^2$ to about $10^{10}$ Pa. In some embodiments, the modulus ranges from about $10^2$ to about $10^{10}$ Pa. In some embodiments, the modulus ranges from about $10^5$ to about $10^{10}$ Pa. In some embodiments, the modulus ranges from about $10^3$ to about $10^5$ Pa. In some embodiments, the polymeric material comprises at least one group selected from —S—, —S—CH$_2$—CH(OH)—, and —CH$_2$—CH(—)—O—. In some embodiments, the modulus gradient is between values having the same degree of magnitude. In some embodiments, the modulus gradient is between values one degree of magnitude apart. In some embodiments, the modulus gradient is between values two degrees of magnitude apart. In some embodiments, the modulus gradient is between values three degrees of magnitude apart. In some embodiments, the modulus gradient is between values four degrees of magnitude apart. In some embodiments, the modulus gradient is between values five degrees of magnitude apart. In some embodiments, the modulus gradient is between values six degrees of magnitude apart. Modulus can be measured by atomic force microscopy (AFM) with sub 10 nm resolution in any dimension.

The following clauses describe certain embodiments.

Clause 1: A method of generating a modulus gradient in a polymeric material, the method comprising subjecting an initial precursor resin mixture to a polymerization or crosslinking stimulus, wherein the initial precursor resin mixture comprises one or more monomers, the one or more monomers comprising at least three different polymerizable or crosslinkable moieties.

Clause 2. The method of clause 1, further comprising generating one or more intermediate resin mixtures, wherein the processing further comprises subjecting the one or more intermediate resin mixtures to one or more polymerization and/or crosslinking stimuli.

Clause 3. The method of clause 2, wherein the one or more intermediate resin mixtures are partially crosslinked or polymerized.

Clause 4. The method of any one of clauses 1 to 3, wherein the polymerizable or crosslinkable moieties are selected from an alkene group, a thiol group, and an epoxy group.

Clause 5. The method of any one of clauses 1 to 3, wherein the one or more intermediate resin mixtures comprise at least one group selected from —S— and —S—CH$_2$—CH(OH)—.

Clause 6. The method of any one of clauses 1 to 3, wherein the one or more intermediate resin mixtures comprise at least one group selected from —S—, —S—CH$_2$—CH(OH)—, and —CH$_2$—CH(—)—O—.

Clause 7. The method of any one of clauses 1 to 6, wherein the polymeric material comprises at least one group selected from —S—, —S—CH$_2$—CH(OH)—, and —CH$_2$—CH(—)—O—.

Clause 8. The method of any one of clauses 1 to 7, wherein the one or more monomers are selected from a monofunctional monomer, a bifunctional monomer, a trifunctional monomer, and a tetrafunctional monomer.

Clause 9. The method of any one of clauses 1 to 7, wherein the one or more monomers are selected from BisDE, TATATO, GDMP, and PETMP.

Clause 10. The method of any one of clauses 1 to 9, wherein the one or more polymerization and/or crosslinking stimuli are selected from subjecting the initial precursor resin mixture and/or any of the intermediate resin mixtures to a light source and/or a raised temperature.

Clause 11. The method of any one of clauses 1 to 9, wherein a polymerization and/or crosslinking stimulus is subjecting the initial precursor resin mixture to a light source.

Clause 12. The method of any one of clauses 1 to 9, wherein the polymerization and/or crosslinking stimuli are selected from subjecting any of the intermediate resin mixtures to at least two different raised temperatures.

Clause 13. The method of clause 12, wherein a first raised temperature is between about 50° C. and about 100° C.

Clause 14. The method of clause 12, wherein a first raised temperature is between about 75° C. and about 85° C.

Clause 15. The method of clause 12, wherein a first raised temperature is about 80° C.

Clause 16. The method of any one of clauses 12 to 15, wherein a second raised temperature is between about 100° C. and about 150° C.

Clause 17. The method of any one of clauses 12 to 15, wherein a second raised temperature is between about 115° C. and about 125° C.

Clause 18. The method of any one of clauses 12 to 15, wherein a second raised temperature is about 120° C.

Clause 19. The method of any one of clauses 1 to 18, wherein the initial precursor resin mixture further comprises a photoinitiator.

Clause 20. The method of any one of clauses 1 to 19, wherein the modulus is selected from Young's modulus (E), shear modulus or modulus of rigidity (G), and bulk modulus (K).

Clause 21. The method of any one of clauses 1 to 19, wherein the modulus is Young's modulus (E).

Clause 22. The method of any one of clauses 1 to 19, wherein the modulus is storage modulus and/or loss modulus.

Clause 23. The method of any one of clauses 1 to 22, wherein the method is a 3D printing method.

Clause 24. A polymeric material having at least one modulus gradient in a spatial direction, the polymeric material made by a method of any one of clauses 1 to 23.

Clause 25: A polymeric material having a modulus gradient over one spatial direction, wherein modulus is measured in a plurality of voxels.

Clause 26. The polymeric material of clause 25, wherein the modulus is selected from Young's modulus (E), shear modulus or modulus of rigidity (G), and bulk modulus (K).

Clause 27. The polymeric material of clause 25, wherein the modulus is Young's modulus (E).

Clause 28. The polymeric material of clause 25, wherein the modulus is storage modulus and/or loss modulus.

Clause 29. The polymeric material of any one of clauses 25 to 28, wherein the modulus ranges from about $10^2$ to about $10^{10}$ Pa.

Clause 30A. The polymeric material of any one of clauses 25 to 28, wherein the modulus ranges from about $10^3$ to about $10^5$ Pa.

Clause 30B. The polymeric material of any one of clauses 25 to 28, wherein the modulus ranges from about $10^5$ to about $10^{10}$ Pa.

Clause 31. The polymeric material of any one of clauses 25 to 30, wherein the polymeric material comprises at least one group selected from —S—, —S—CH$_2$—CH(OH)—, and —CH$_2$—CH(—)—O—.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

Examples

Preparation of multimaterial resins: Pentaerythritol tetra (3-mercaptopropionate; PETMP), triallyl-1,3,5-triazine-2,4,6-trione (TATATO), bisphenol a diglycidyl ether (BisDE), and pyrogallol (PYL)—Sigma-Aldrich. Ethylene glycol di(3-mercaptopropionate) (GDMP)—Tokyo Chemical Industry Co. Technicure® LC-80 (LC-80)—A&C Catalysts, Inc. Photoinitiator Speedcure 2022—Lambson, Inc. All monomers used as received. A stoichiometric ratio of 1:1:1 of thiol:vinyl:epoxy functional groups containing 2 wt % LC-80, 1.25 wt % Irgacure 2022 and 0.09 wt % PYL was prepared. Without wishing to be bound by any particular theory, it was hypothesized that to obtain loosely crosslink network for soft region, 10 mol % of thiol functional groups should come from tetrathiol crosslinker PETMP and the rest of the thiol functional groups belong to dithiol GDMP. A centrifugal mixer (Speedmixer DAC 600.2 VAC-LR Flak-Tek) blends resin with micro ceramic beads at 1500 rpm for 35 s followed by 2000 rpm for 55 s.

Figure 1B:
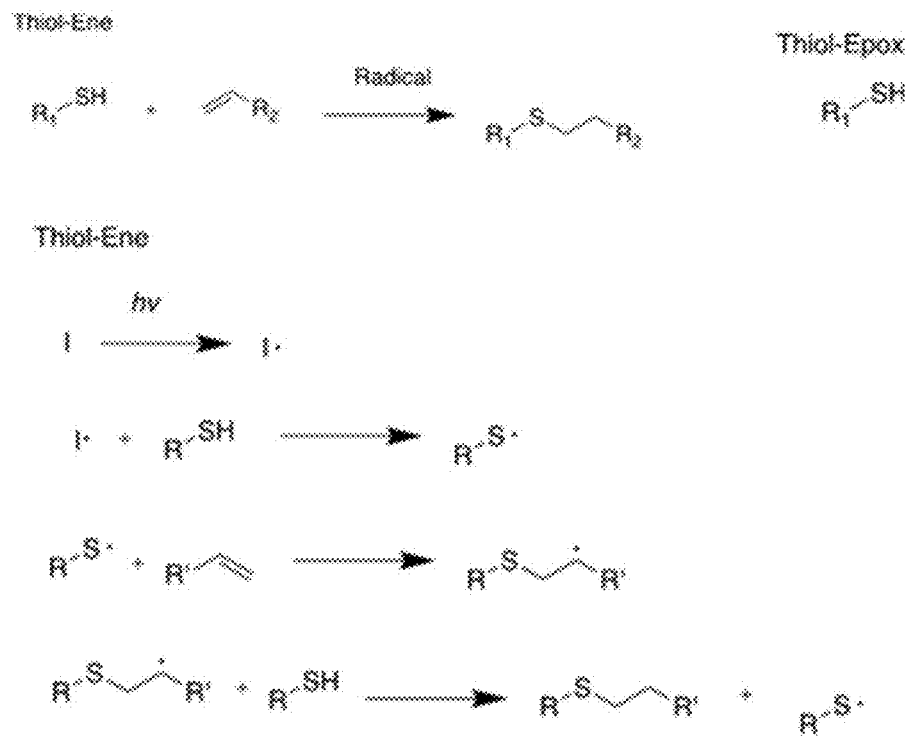
Figure 1C:
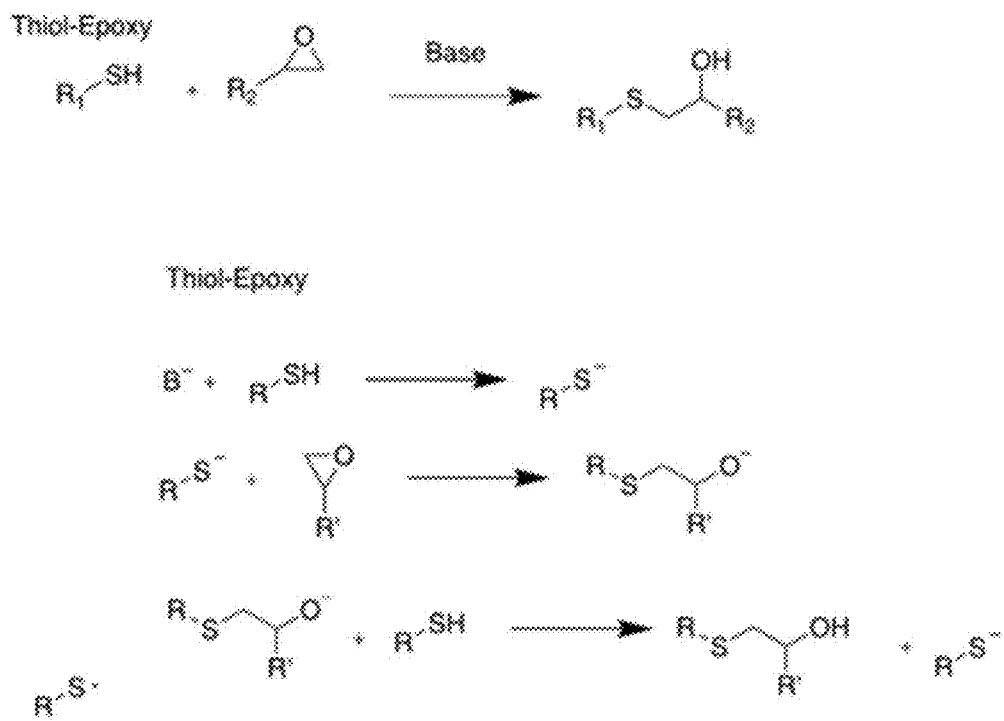
Figure 1D:
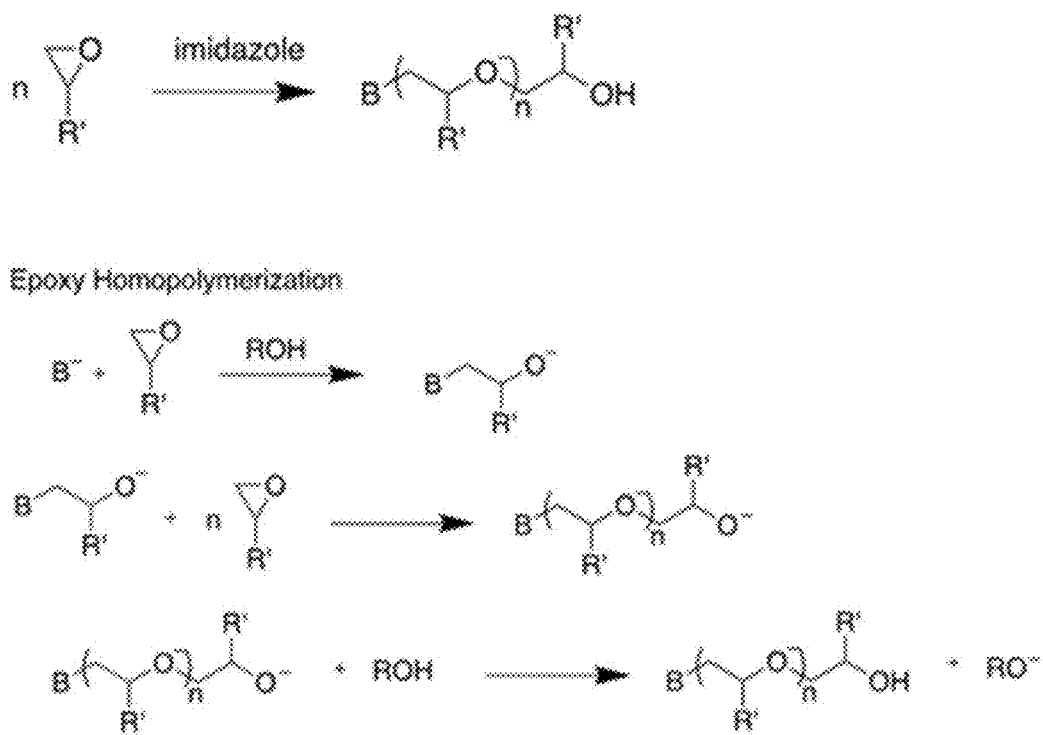
Figure 1E:
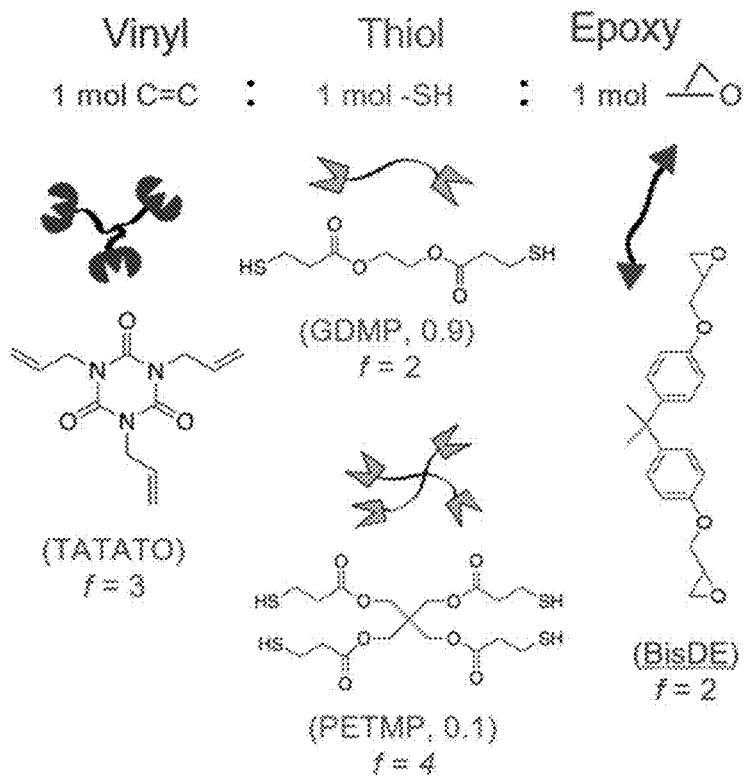
Figure 1F:
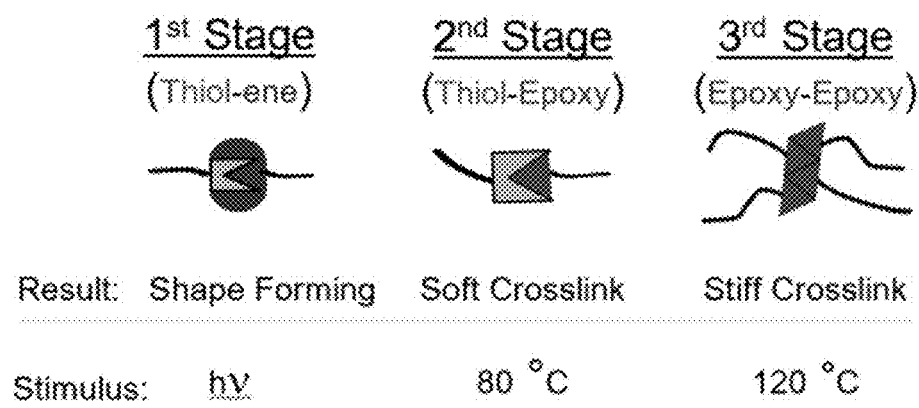
Figure 1G:
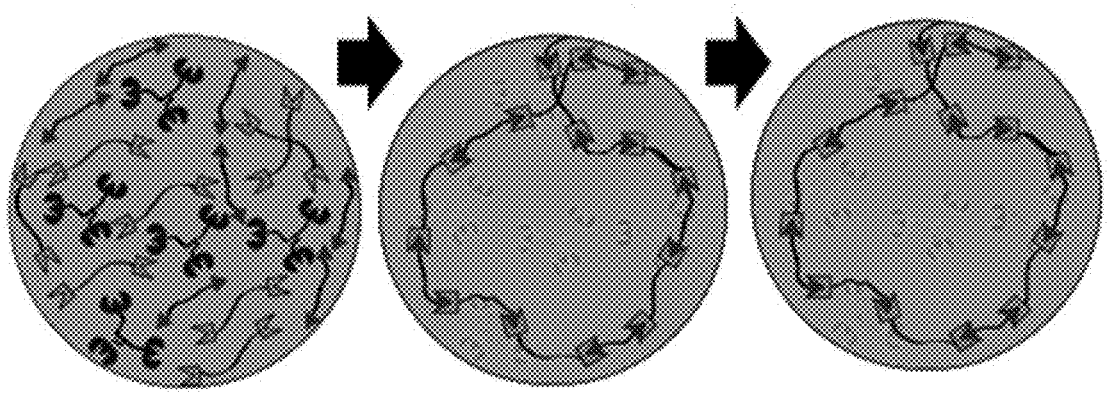
Figure 1H:
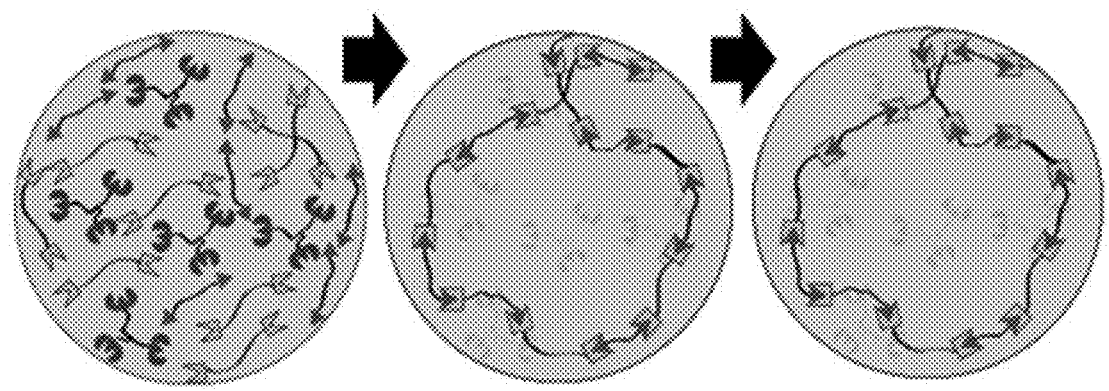

FIGS. 1A-1H illustrate a dosage depended photopolymer resin mixture with tunable properties, and reaction(s) mechanism; FIG. 1A illustrates how initial light dosage can effectively control materials properties. Dosage controlled thiol conversion based on thiol-ene photopolymerization and the residual thiol lead to sequential thiol-epoxy and epoxy homopolymerization; FIG. 1B illustrates the reaction mechanism for photo-controlled step growth polymerization; FIG. 1C illustrates the reaction mechanism for thermally initiated step growth polymerization; FIG. 1D illustrates the reaction mechanism for thermally initiated chain growth polymerization; FIG. 1E illustrates a material selection for some embodiments, including exemplary and non-limiting functionalities, and exemplary and non-limiting ratios; FIG. 1F illustrates a process described herein, including exemplary and non-limiting steps and results of polymerization and/or crosslinking, stimuli, and molar conversions; FIG. 1G-1H illustrate exemplary and non-limiting processes' steps described herein, including polymerization and/or crosslinking steps.

Photo-Rheology: Rheology experiments conducted using a TA Instruments Discovery Hybrid 2 rheometer (DHR-2) with photocuring (PCA) and upper heated plate (UHP) accessories (TA Instruments). Samples were prepared on 20 mm parallel geometry plates with a gap thickness t=500 μm for dynamic testing. The transparent acrylic bottom plate transmits filtered ($\lambda$=405 nm) light from a source (Omnicure Series 1500, Lumen dynamics) into the sample. The power density on the sample during illumination was measured by a Model 222 (G&R Labs) Radiometer (405 nm). For the first stage, a dynamic time sweep test was performed using a constant strain ($\gamma$=1%) and frequency ($\bar{\omega}$=1 Hz) at 25° C. while controlling photoexposure, both irradiative power and length of exposure. In the second stage, the UHP ramps the temperature to 80° C. at the rate of 10° C.·min$^{-1}$ and holds for 1 h at a constant strain ($\gamma$=0.1%) and frequency of ($\bar{\omega}$=0.1 Hz). In the third stage, the UHP again increases the temperature to 120° C. at a rate of 10° C.·min$^{-1}$ for a hold time of 10 h while maintaining the previous strain ($\gamma$=0.1%) and frequency ($\bar{\omega}$=0.1 Hz). Data collection occurs at a frequency of 1 Hz. The initial, or "dark," viscosity, was calculated by the average viscosity 10 seconds prior to first illumination.

Fourier Transform Infrared Spectroscopy (FTIR): Polymerization kinetics were inferred using a Fourier Transform Infrared (FTIR) Spectrometer (Bruker Invenio R) with Variable Angle (ZnSe crystal 45° flat plate, 30° angle of incidence, Pike Technologies) and Heated ATR Stage (Pike Technologies) that tracks the real-time IR peaks in transmission mode. Series scans were recorded with spectra taken at the rate of 1 second per scan for photoirradiation (1 scan with a resolution 4 cm$^{-1}$) and 4 second per scan for elevated temperature measurements (16 scans with resolution 4 cm$^{-1}$). Irradiation was performed using a UV wand (Omnicure S2000) with 405 nm bandgap filter ($J_e$=5 or 14.5 mW·cm$^{-2}$). The conversion of the thiol functional groups was determined at 2500 to 2600 cm$^{-1}$, vinyl functional groups at 1300 to 1320 cm$^{-1}$, and epoxy functional groups at 900 to 930 cm$^{-1}$, by monitoring the disappearance of the corresponding IR peaks. Integrations used a C method for determining the baseline.

Tensile Tests: The tensile sample was fabricated with a commercial desktop stereolithography printer (Ember by Autodesk) using a blue-light LED projector ($\lambda$=405 nm) for different exposure times (t=0, 3.5, 4.5, 6.5 and 15 s). The samples were cured between two glass plates coated with a thin Teflon sheet. A photoirradiation intensity of approximately Je~30 mW·cm$^{-2}$ was measured immediately above the bottom Teflon coated plate using a Model 222 (G&R Labs) radiometer with 405 nm probe. The final tensile samples possessed a geometry of ~10 mm×1 mm×15 mm (width×thickness×height). An Instron Universal Testing System (Model 5943) with pneumatic clamps ($\Delta$P=50 psi) pulled these samples at a rate of 75 mm·min$^{-1}$ while a video extensometer optically tracked strain between two manually placed ink dots in the gage region of the coupon.

Surface Energy Measurements: Double sessile drop tests were conducted using a Kruss Mobile Surface Analyzer (MSA). In this experiment, the MSA deposits drops (V=0.5 μL) of two probe liquids (water and diiodomethane) simultaneously while an on-board camera records and measures the contact angles with the substrate. From this data, the instrument calculates the total surface energy as well as the polar and dispersive components using the Owens, Wendt, Rabel and Kaelble (OWRK) method. The measurements were conducted at least seven times for each material.

3D Printing: All objects were printed on a consumer grade desktop stereolithography printer (Ember by Autodesk) using a blue-light LED projector ($\lambda$=405 nm, $J_e$~30 mW·cm$^{-2}$) with attached wiper blade assembly. Each layer was exposed for an equivalent time period (t=10 s). Autodesk Print Studio software sliced the CAD models into discrete 0.250 mm layers and created a corresponding black and white image stack. Manual manipulation of the image stack using Image software (Microsoft Paint) enables greyscaling of the project image during printing.

Figure 2D:
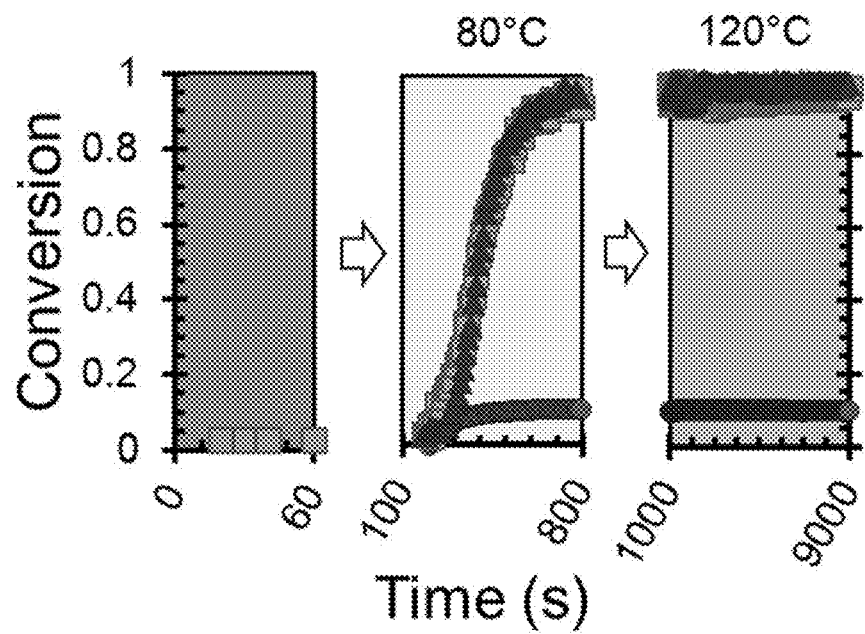
Figure 2E:
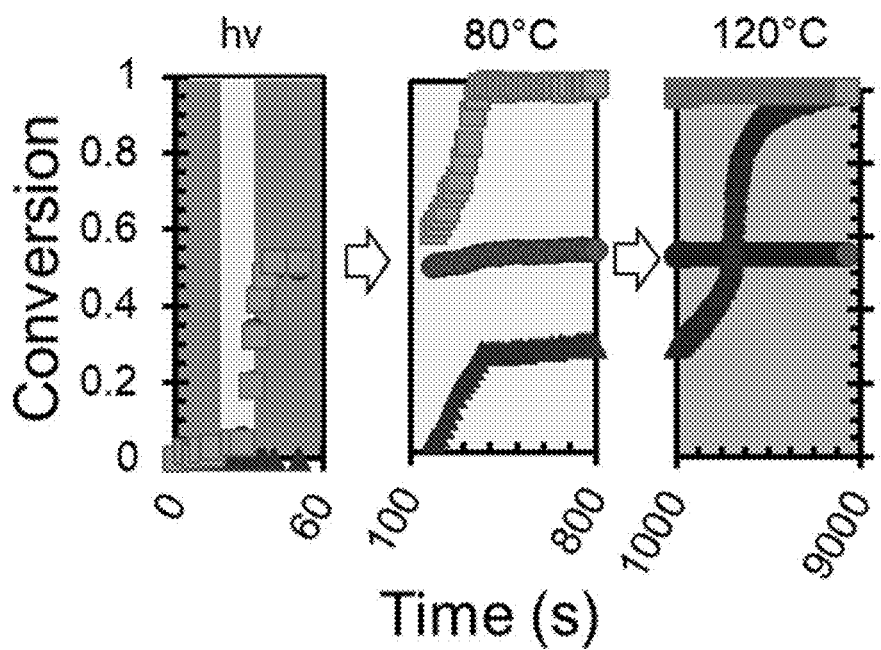
Figure 2F:
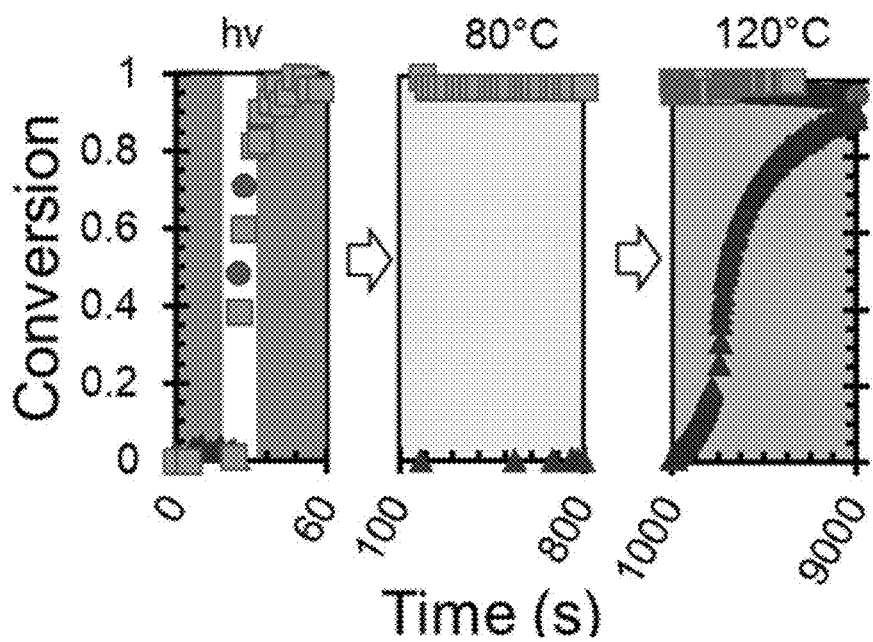

FIGS. 2A-2F illustrate the rheological and FTIR changes during a process described herein, as a function of light intensity and/or initial photodosage, where the first step of the process includes light exposure, the second step includes exposure to an elevated temperature (i.e., 80° C.), and the third step includes exposure to an even more elevated temperature (i.e., 120° C.); FIG. 2A: change in modulus for no light exposure; FIG. 2B: change in modulus for exposure to 5 mW/cm² visible light; FIG. 2C: change in modulus for exposure to 14 mW/cm² visible light; FIG. 2D: change in conversion for $H_e$=0 mJ·cm$^{-2}$ and x≈0; FIG. 2E: change in conversion for $H_e$=62.5 mJ·cm$^{-2}$ (at 5 mW/cm² of 405 nm light) and x≈0.52; FIG. 2F: change in conversion for $H_e$=175 mJ·cm$^{-2}$ (at 14 mW/cm² of 405 nm light) and x≈0.98.

Figure 3E:
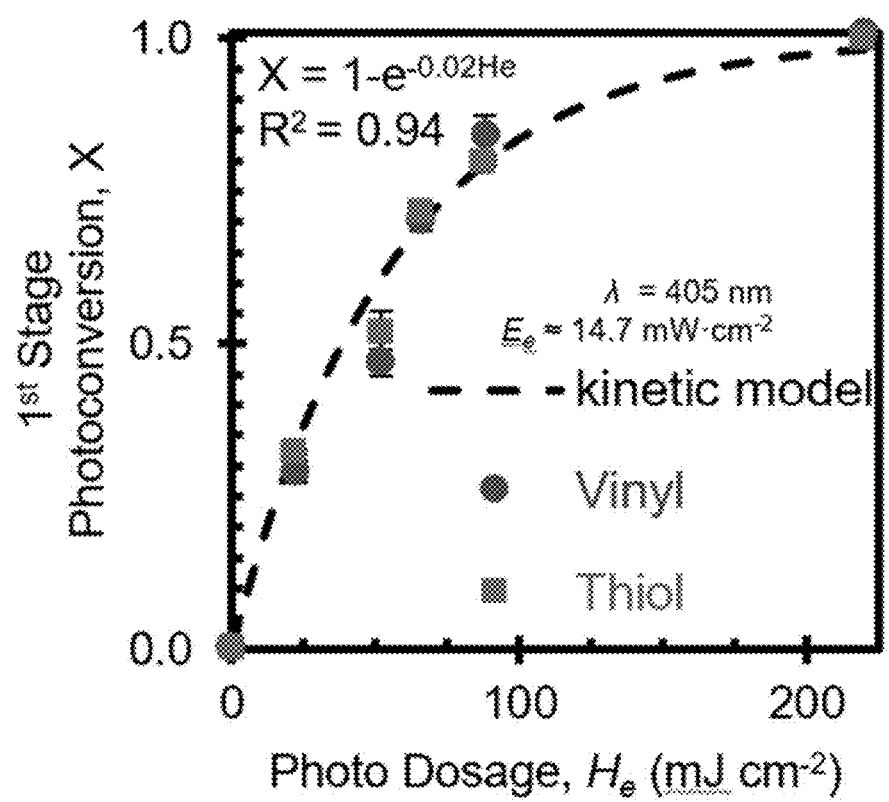
FIG. 3E illustrates $1^{st}$ stage photoconversion, (X), as a function of photo dosage, $H_e$ (mJ·cm$^{-2}$).

FIG. 3A illustrates thiol conversion as a function of time for various photodosages—higher photodosage results in faster thiol conversion; FIG. 3B illustrates stress as a function of strain for various photodosages; FIG. 3C illustrates the range of modulus covered by previously known mono or bi material systems compared to the range of modulus covered by the systems described herein; FIG. 3D illustrates $E_{[1-1.5\%]}$ as a function of photoconversion (X); FIG. 3E illustrates $1^{st}$ stage photoconversion, (X), as a function of photo dosage, $H_e$ (mJ·cm$^{-2}$).

Figure 4A:
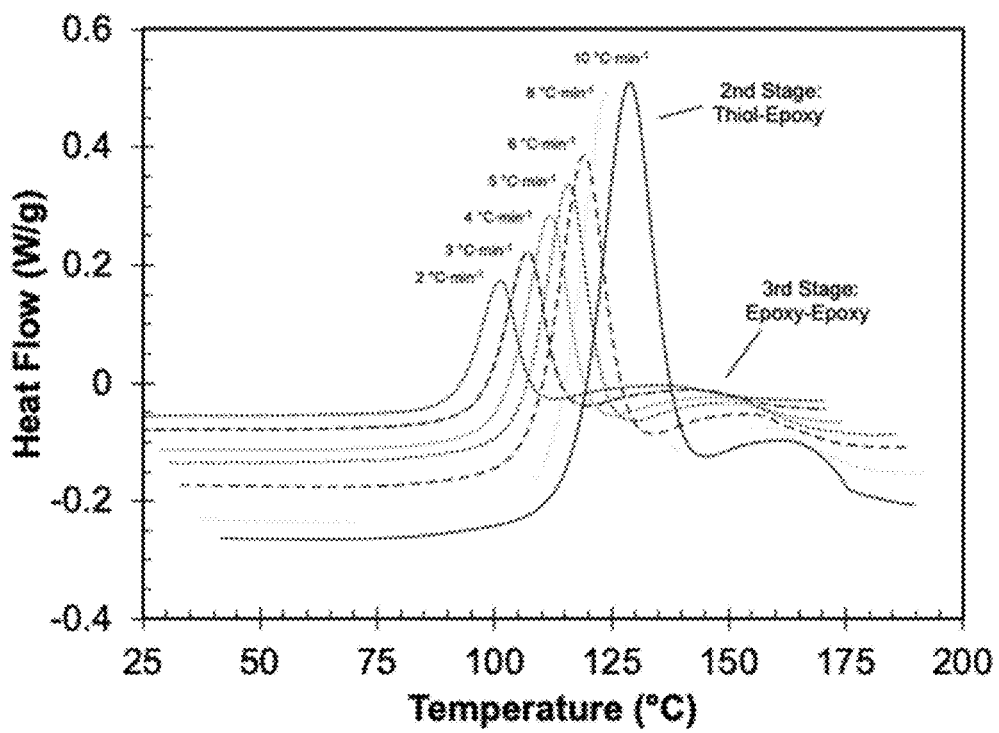
FIG. 4A illustrates heat flow as function of temperature, where the two peaks are illustrative of the two thermally initiated polymerization reactions.
Figure 4B:
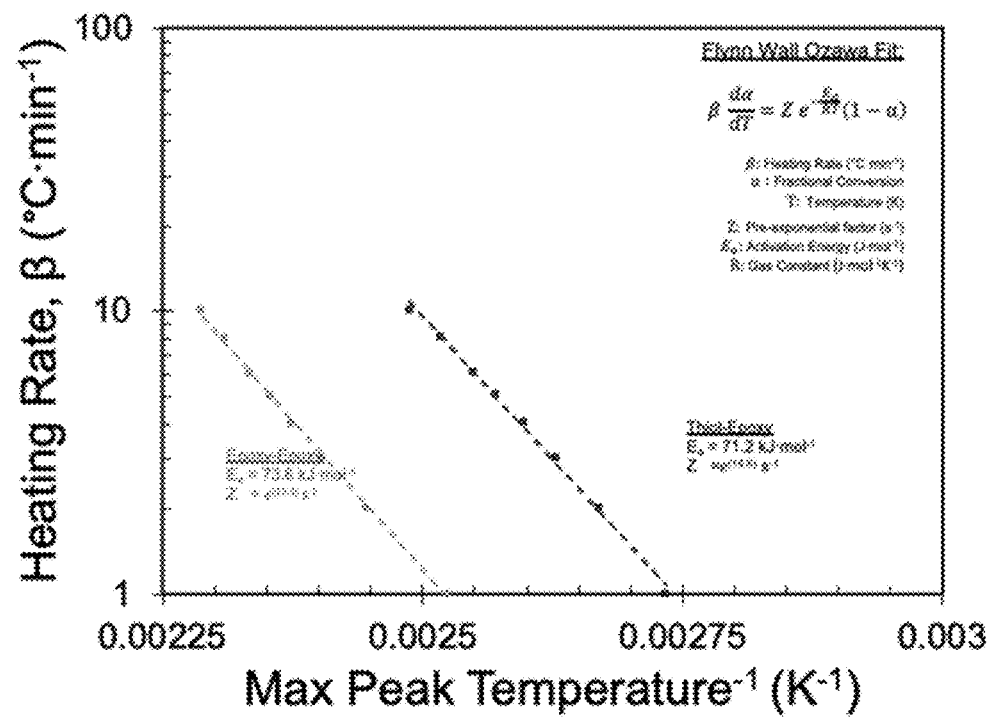
FIG. 4B illustrates heating rate as a function of maximum peak temperature for the two thermally initiated polymerization reactions.
Figure 4C:
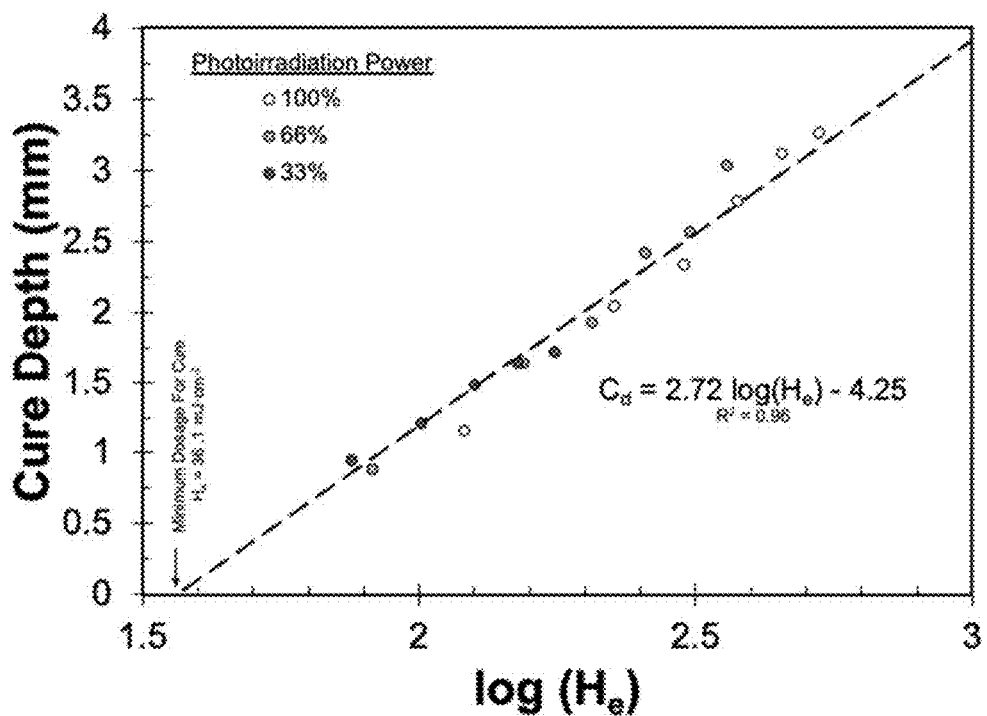
FIG. 4C illustrates the cure depth as a function of log($H_e$)
Figure 4D:
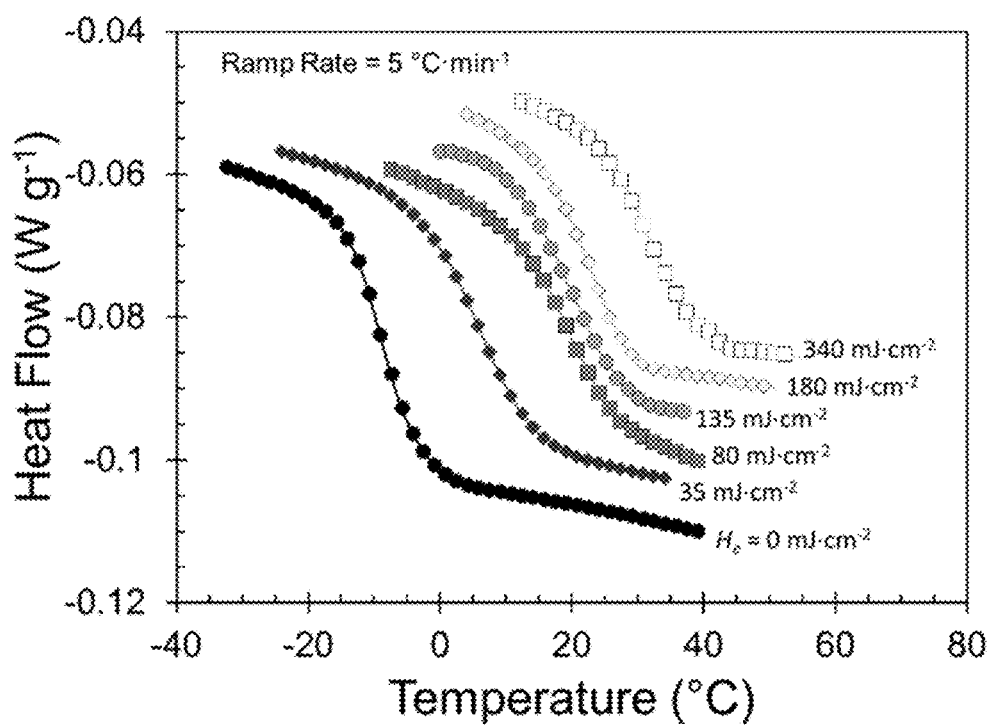
FIG. 4D illustrates heat flow as a function of temperature.
Figure 4E:
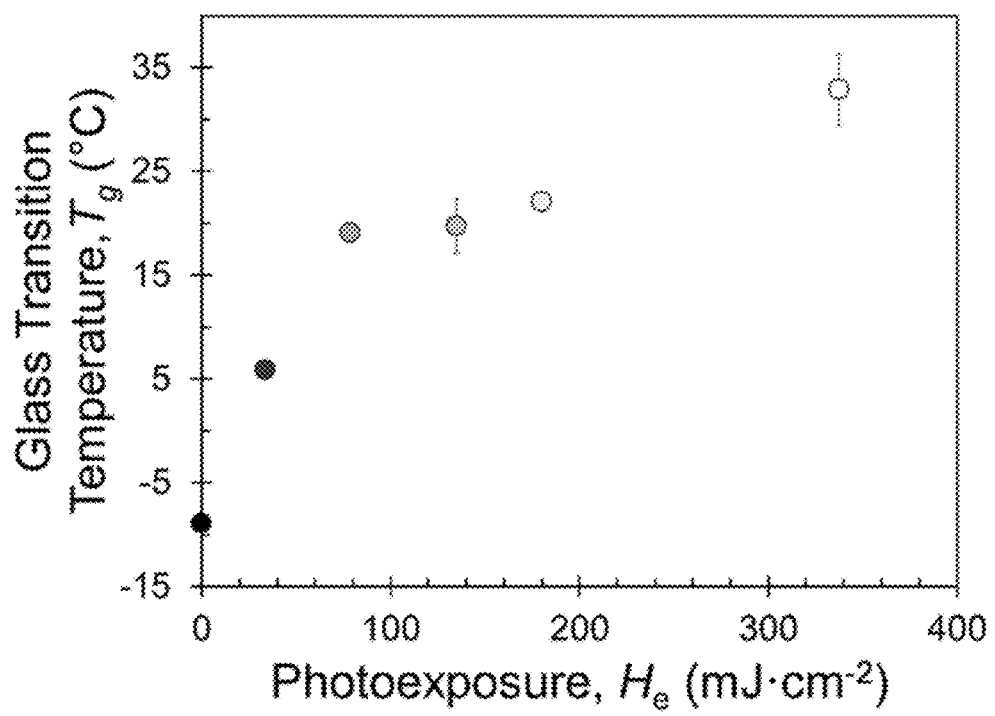
FIG. 4E illustrates glass transition temperature as a function of photoexposure.
Figure 4F:
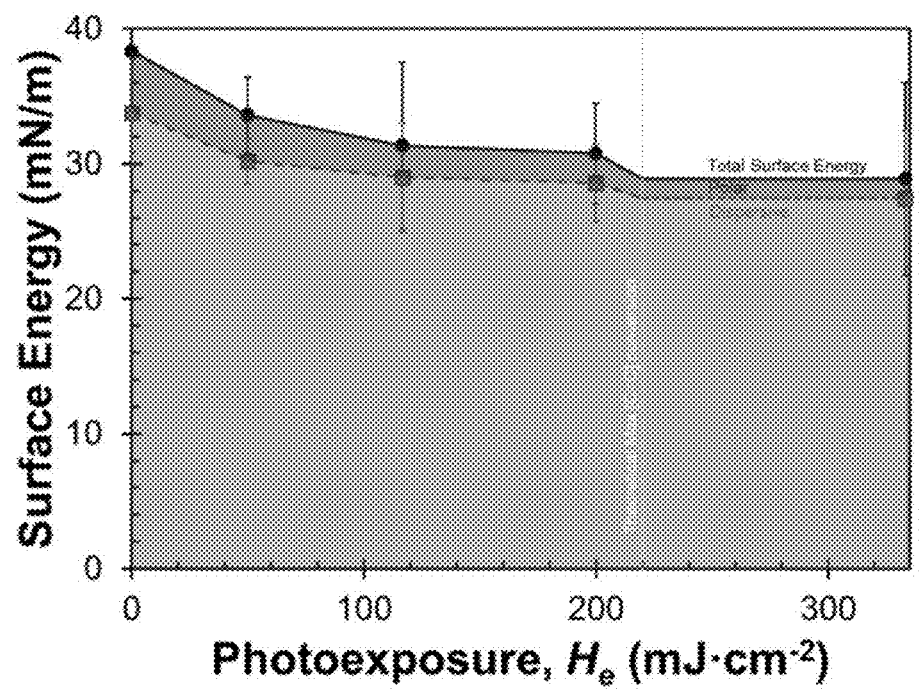
FIG. 4F illustrates surface energy as a function of photoexposure.

FIG. 4A illustrates heat flow as a function of temperature, where the two peaks are illustrative of the two thermally initiated polymerization reactions; FIG. 4B illustrates heating rate as a function of maximum peak temperature for the two thermally initiated polymerization reactions; FIG. 4C illustrates the cure depth as a function of log($H_e$); FIG. 4D illustrates heat flow as a function of temperature; FIG. 4E illustrates glass transition temperature as a function of photoexposure; FIG. 4F illustrates surface energy as a function of photoexposure.

REFERENCES (1) Tumbleston, J. R.; Shirvanyants, D.; Ermoshkin, N.; Janusziewicz, R.; Johnson, A. R.; Kelly, D.; Chen, K.; Pinschmidt, R.; Rolland, J. P.; Ermoshkin, A.; et al. Continuous Liquid Interface Production of 3D Objects. Science (80-.). 2015, 347 (6228), 1349-1352.
(2) Dolinski, N. D.; Page, Z. A.; Callaway, E. B.; Eisenreich, F.; Garcia, R. V.; Chavez, R.; Bothman, D. P.; Hecht, S.; Zok, F. W.; Hawker, C. J. Solution Mask Liquid Lithography (SMaLL) for One-Step, Multimaterial 3D Printing. Adv. Mater. 2018, 30 (31), 1-6.
(3) Kelly, B. E.; Bhattacharya, I.; Heidari, H.; Shusteff, M.; Spadaccini, C. M.; Taylor, H. K. Volumetric Additive Manufacturing via Tomographic Reconstruction. Science 2019, 363 (6431), 1075-1079.
(4) Choi, J.-W.; Kim, H.-C.; Wicker, R. Multi-Material Stereolithography. J. Mater. Process. Technol. 2011, 211 (3), 318-328.
(5) Zhou, C.; Chen, Y.; Yang, Z.; Khoshnevis, B. Development of a Multi-Material Mask-Image-Projection-Based Stereolithography for the Fabrication of Digital Materials. 22nd Annu. Int. Solid Free. Fabr. Symp.—An Addit. Manuf Conf SFF 2011 2011, 65-80.
(6) Vaezi, M.; Chianrabutra, S.; Mellor, B.; Yang, S. Multiple Material Additive Manufacturing—Part 1: A Review. Virtual Phys. Prototyp. 2013, 8 (1), 19-50.
(7) Odent, J.; Vanderstappen, S.; Toncheva, A.; Pichon, E.; Wallin, T. J.; Wang, K.; Shepherd, R. F.; Dubois, P.; Raquez, J.-M. Hierarchical Chemomechanical Encoding of Multi-Responsive Hydrogel Actuators via 3D Printing. J. Mater. Chem. A 2019, 7 (25), 15395-15403.
(8) Yin, H.; Ding, Y.; Zhai, Y.; Tan, W.; Yin, X. Orthogonal Programming of Heterogeneous Micro-Mechano-Environments and Geometries in Three-Dimensional BioStereolithography. Nat. Commun. 2018, 9, 4096.
(9) Schwartz, J. J.; Boydston, A. J. Multimaterial Actinic Spatial Control 3D and 4D Printing. Nat. Commun. 2019, 10 (1), 1-10.
(10) Larsen, E. K. U.; Larsen, N. B.; Almdal, K.; Larsen, E. K. U.; Larsen, N. B.; Almdal, K. Multimaterial Hydrogel with Widely Tunable Elasticity by Selective Photopolymerization of PEG Diacrylate and Epoxy Monomers. J. Polym. Sci. Part B Polym. Phys. 2016, 54 (13), 1195-1201.
(11) Zhang, X.; Cox, L.; Wen, Z.; Xi, W.; Ding, Y.; Bowman, C. N. Implementation of Two Distinct Wavelengths to Induce Multistage Polymerization in Shape Memory Materials and Nanoimprint Lithography. Polymer (Guildf). 2018, 156, 162-168.
(12) Zhang, X.; Xi, W.; Huang, S.; Long, K.; Bowman, C. N. Wavelength-Selective Sequential Polymer Network Formation Controlled with a Two-Color Responsive Initiation System. Macromolecules 2017, 50 (15), 5652-5660.

The invention claimed is:

1. A method of generating a modulus gradient in a polymeric material, the method comprising:
    subjecting an initial precursor resin mixture to a polymerization or crosslinking stimulus, wherein the initial precursor resin mixture comprises one or more monofunctional, bifunctional, trifunctional, and tetrafunctional monomers, the one or more monomers comprising at least three different polymerizable or crosslinkable moieties selected from an alkene group, a thiol group, and an epoxy group, wherein the one or more monomers comprise at least a bifunctional thiol and a tetrafunctional thiol,
    generating one or more intermediate resin mixtures, and subjecting the one or more intermediate resin mixtures to one or more polymerization and/or crosslinking stimuli selected from at least two different raised temperatures, wherein a first raised temperature is between about 50° C. and about 100° C.,
    wherein the method is a 3D printing method.

2. The method of claim 1, wherein the one or more intermediate resin mixtures are partially crosslinked or polymerized.

3. The method of claim 1, wherein the one or more intermediate resin mixtures comprise at least one group selected from —S— and —S—CH$_2$—CH(OH)—.

4. The method of claim 1, wherein the one or more intermediate resin mixtures comprise at least one group selected from —S—, —S—CH$_2$—CH(OH)—, and —CH$_2$—CH(—)—O—.

5. The method of claim 1, wherein the polymeric material comprises at least one group selected from —S—, —S—CH$_2$—CH(OH)—, and —CH$_2$—CH(—)—O—.

6. The method of claim 1, wherein the one or more monomers are selected from bisphenol A diglycidyl ether (BisDE), triallyl-1,3,5-triazine-2,4,6-trione (TATATO), ethylene glycol di(3-mercaptopropionate) (GDMP), and pentaerythritol tetra(3-mercaptopropionate) (PETMP).

7. The method of claim 1, wherein the one or more polymerization and/or crosslinking stimuli are selected from subjecting the initial precursor resin mixture and/or any of the intermediate resin mixtures to a light source and/or a raised temperature.

8. The method of claim 1, wherein a polymerization and/or crosslinking stimulus is subjecting the initial precursor resin mixture to a light source.

9. The method of claim 1, wherein a first raised temperature is between about 75° C. and about 85° C.

10. The method of claim 1, wherein a second raised temperature is between about 100° C. and about 150° C.

11. The method of claim 1, wherein a second raised temperature is between about 115° C. and about 125° C.

12. The method of claim 1, wherein the initial precursor resin mixture further comprises a photoinitiator.

13. The method of claim 1, wherein the modulus is selected from Young's modulus (E), shear modulus or modulus of rigidity (G), and bulk modulus (K).

14. The method of claim 1, wherein the modulus is Young's modulus (E).

15. The method of claim 1, wherein the modulus is storage modulus and/or loss modulus.

\* \* \* \* \*